(12) United States Patent
Zheng

(10) Patent No.: US 7,916,740 B2
(45) Date of Patent: Mar. 29, 2011

(54) ACCESS NETWORK SYSTEM, ACCESS EQUIPMENT, ARP PROXY METHOD AND AN IP BRIDGING FORWARDING METHOD

(75) Inventor: Ruobin Zheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 86 days.

(21) Appl. No.: 12/361,164

(22) Filed: Jan. 28, 2009

(65) Prior Publication Data

US 2009/0135829 A1 May 28, 2009

Related U.S. Application Data

(63) Continuation of application No. PCT/CN2007/070393, filed on Jul. 31, 2007.

(30) Foreign Application Priority Data

Aug. 1, 2006 (CN) ............... 2006 1 0104208
Sep. 15, 2006 (CN) ............... 2006 1 0153985

(51) Int. Cl.
*H04L 12/28* (2006.01)
*H04L 12/56* (2006.01)

(52) U.S. Cl. ......... 370/401; 370/404; 370/405; 370/407

(58) Field of Classification Search ............ 370/401, 370/404, 407, 405
See application file for complete search history.

(56) References Cited

U.S. PATENT DOCUMENTS

| 5,550,818 | A | 8/1996 | Brackett et al. | |
|---|---|---|---|---|
| 6,289,093 | B1 | 9/2001 | Liinamaa et al. | |
| 6,762,992 | B1 | 7/2004 | Lemieux | |
| 6,965,775 | B2 | 11/2005 | Antoniou et al. | |
| 7,460,495 | B2* | 12/2008 | Li | 370/267 |
| 7,619,967 | B2* | 11/2009 | Meged et al. | 370/222 |
| 2002/0012138 | A1* | 1/2002 | Graves et al. | 359/118 |

(Continued)

FOREIGN PATENT DOCUMENTS

CN 1265809 A 9/2000

(Continued)

OTHER PUBLICATIONS

David C. Plummer (Nov. 1982). "RFC 826, An Ethernet Address Resolution Protocol—or—Converting Network Protocol Addresses to 48.bit Ethernet Address for Transmission on Ethernet Hardware". Internet Engineering Task Force, Network Working Group. http://tools.ietf.org/html/rfc826.*

(Continued)

*Primary Examiner* — Ayaz R Sheikh
*Assistant Examiner* — Tarell Hampton
(74) *Attorney, Agent, or Firm* — Leydig, Voit & Mayer, Ltd.

(57) ABSTRACT

An access network system, an address resolution protocol proxy method and an IP bridging forwarding method for the access network system are disclosed. The access network system comprises: one or more access network edge nodes that connect to one or more access nodes; one or more access nodes that connect to user terminals to the access network, and a reference point that is introduced between two adjacent access nodes for the access nodes interconnection. With this system, the multi-cast or broadcast flow in the network can be reduced and the communication delay and path can also be decreased. Therefore the communication bottleneck brought by BRAS/BNG can be avoided.

16 Claims, 31 Drawing Sheets

U.S. PATENT DOCUMENTS

| | | | |
|---|---|---|---|
| 2003/0161329 A1* | 8/2003 | Corey, Jr. ................. 370/395.64 |
| 2004/0175071 A1 | 9/2004 | Oberg |
| 2005/0201381 A1* | 9/2005 | Abbasi et al. ............ 370/395.21 |
| 2006/0034292 A1* | 2/2006 | Wakayama et al. ........ 370/395.5 |
| 2006/0073835 A1 | 4/2006 | Antoniou et al. |
| 2007/0008979 A1 | 1/2007 | Keller-Tuberg |

FOREIGN PATENT DOCUMENTS

| | | |
|---|---|---|
| CN | 1267980 A | 9/2000 |
| CN | 1567749 A | 1/2005 |
| CN | 1653833 A | 8/2005 |
| EP | 1 343 278 A1 | 9/2003 |
| WO | WO 01/89229 A2 | 11/2001 |
| WO | WO 03/007521 A1 | 1/2003 |

OTHER PUBLICATIONS

Ansari et al., "A New Control Architecture with Enhanced ARP, Burst-Based Transmission, and Hop-Based Wavelenght Allocation for Ethernet-Supported IP-Over-WDM MANs," *IEEE Journal on Selected Areas in Communications*, 22(8): 1419-1431 (Oct. 2004).

DSL Forum, "Technical Report TR-101, Migartion to Ethernet-Based DSL Aggregation," IEEE, 1-101 (Apr. 2006).

Frohler et al., "ATM Cell Based Ring Architecture with Optimized Bandwidth Utilization, High Availability and Without Additional Protocol Overhead," *IP.COM Journal*, 1-4 (Oct. 2002).

* cited by examiner

US 7,916,740 B2

ACCESS NETWORK SYSTEM, ACCESS EQUIPMENT, ARP PROXY METHOD AND AN IP BRIDGING FORWARDING METHOD

CROSS-REFERENCE TO RELATED APPLICATIONS

This application is a continuation of International Patent Application No. PCT/CN2007/070393, filed Jul. 31, 2007, which claims priority to Chinese Patent Application No. 200610104208.3, filed Aug. 1, 2006 and Chinese Patent Application No. 200610153985.7, filed Sep. 15, 2006, all of which are hereby incorporated by reference in their entirety.

FIELD OF THE INVENTION

The present invention relates to the technical field of communications, and particularly to an access network system, an access device in the system, and an address resolution protocol proxy and an IP bridging forwarding method thereof.

BACKGROUND OF THE INVENTION

The Digital Subscriber Line (DSL) network architecture is evolving from the Point to Point Protocol over Asynchronous Transfer Mode (PPP over ATM) to an enabling architecture of IP Quality of Service (QoS) based on Ethernet aggregation and connection. Under this background, a general reference architecture of the DSL is illustrated in FIG. 1.

In the DSL reference architecture as illustrated in FIG. 1, T is a reference point between a User Equipment (UE) and a Residential Gateway (RG) in a Customer Premises Network (CPN); U is a reference point between an RG and an Access Node (AN, i.e., DSL Access Multiplexer, DSLAM); in an Access Network (AN), there is an Aggregation Network between the AN (i.e., the DSLAM) and a Broadband Remote Access Server (BRAS) or a Broadband Network Gateway (BNG); V is an Ethernet Aggregation reference point between the AN (i.e., DSLAM) and the BRAS/BNG in the access network; A10 is a reference point between the access network and a Service Provider (SP). The reference point A10 may connect an Application Service Provider (ASP) to a Network Service Provider (NSP) including an access network, or connect the NSP to an access network in a visiting area in the scenario of roaming. The CPN is connected with the access network in a DSL access technique. For a Passive Optical Network (PON), the AN is an Optical Line Termination (OLT), and the CPN is connected with the access network in a PON access technique, etc.

At present, as illustrated in the DSL reference architecture of FIG. 1, there is no reference point between ANs (i.e., DSLAMs) of the DSL network, and only star or tree networking can be adopted between the ANs (i.e., DSLAMs) and the BRAS/BNG of the DSL network. In the procedure of attempting to achieve the present invention, the inventor finds that the DSL reference architecture of FIG. 1 has at least the following disadvantages:

1. For providing multicast services such as IP TV, the BRAS/BNG and the aggregation network should support multicast copy, thereby the existing DSL network should be modified. A schematic diagram of a multicast and broadcast model of a DSL network with star or tree networking is illustrated in FIG. 2. Because star or tree networking paths (BNG->AN1, BNG->AN2, BNG->AN3, . . . , BNG->ANn) are adopted to transmit multicast or broadcast data streams, which results in a large amount of multicast or broadcast traffic in the DSL network.

2. If a network single point of failure occurs in the connection between an AN and the BRAS/BNG as illustrated in FIG. 3, the AN disconnects with the BRAS/BNG, and all users connected to the AN are provided with service.

3. The traffic between users covered by different ANs should be transferred by the BRAS/BNG. A path for communication between users covered by different ANs is illustrated in FIG. 4. The path is long with a long delay. The BRAS/BNG becomes a bottleneck for the communication and can not meet the requirements of future VoIP and Peer-to-Peer communications.

SUMMARY OF THE INVENTION

The present invention is to provide an access network system, an access device in the system, an address resolution protocol proxy and IP bridging forwarding method thereof. The present invention may be applied to a digital subscriber line network and a passive optical network, so as to reduce multicast or broadcast traffic in such a network, to reduce the delay, and to shorten the communication path, thereby preventing the BRAS/BNG from becoming a bottleneck for the communication.

An object of the present invention is achieved by the following technical solutions.

An access network system includes one or more access network edge nodes, each of which connected with one or more access nodes; and the one or more access nodes, adapted to enable a user terminal to access an access network, where a reference point is introduced between the access nodes to support connections between the access nodes.

An access device in an access network system, includes (1) a user-side port module, adapted to communicate with a user terminal; (2) a network-side port module, adapted to communicate with an access network edge node; (3) an access device-side port module, adapted to communicate with another access device in the access network system; (4) an address resolution protocol proxy module, which is connected to the user-side port module, the network-side port module and the access device-side port module, adapted to proxy-forward an address resolution protocol message; and (5) an IP bridging forwarding module, which is connected to the user-side port module, the network-side port module and the access device-side port module, adapted to forward a packet.

An address resolution protocol proxy method in an access network system, applied to address resolution protocol proxy between a first access node and a second access node of multiple access nodes, includes (1) forwarding, by the first access node, an address resolution protocol request from an address resolution protocol requestor to the second access node, and sending, by the first access node, the MAC address of the first access node in a first address resolution protocol in response to the address resolution protocol request; and (2) sending, by the second access node, the MAC address of the second access node in a second address resolution protocol in response to another address resolution protocol request from the first access node.

An IP bridging forwarding method in an access network system, applied to IP bridging forwarding between a first access node and a second access node of multiple access nodes, includes (1) creating an IP bridging forwarding table in the first access node and the second access node; (2) searching, by at least one of the first access node and the second access node, in the IP bridging forwarding table according to an IP address in a received packet to obtain at least one of IP session information and IP service connection information;

(3) updating, by the at least one of the first access node and the second access node, MAC frame header information in the received packet according to the at least one of IP session information and IP service connection information; and (4) forwarding, by the first access node, the updated packet to the second access node, or forwarding, by the second access node, the updated packet to the first access node.

The present invention reduces multicast or broadcast traffic in the network, reduces the delay and shortens the communication path, thereby preventing the BRAS/BNG from becoming a bottleneck for communications.

BRIEF DESCRIPTION OF THE DRAWINGS

The drawings provide further understanding of the present invention, and are incorporated in the present application to constitute a part of the present application. The drawings together with the description show embodiments of the present invention to make clear of the principle of the present invention.

DETAILED DESCRIPTION OF THE INVENTION

The present invention is described in further detail with reference to the attached drawings and embodiments as follows.

Figure 1:
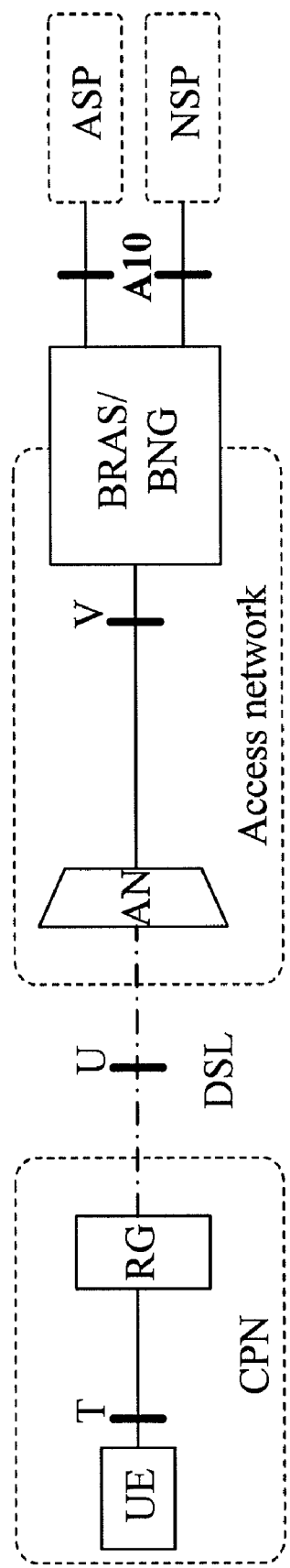
FIG. 1 is a schematic diagram of a multimedia broadcast and multicast service function layer.
Figure 2:
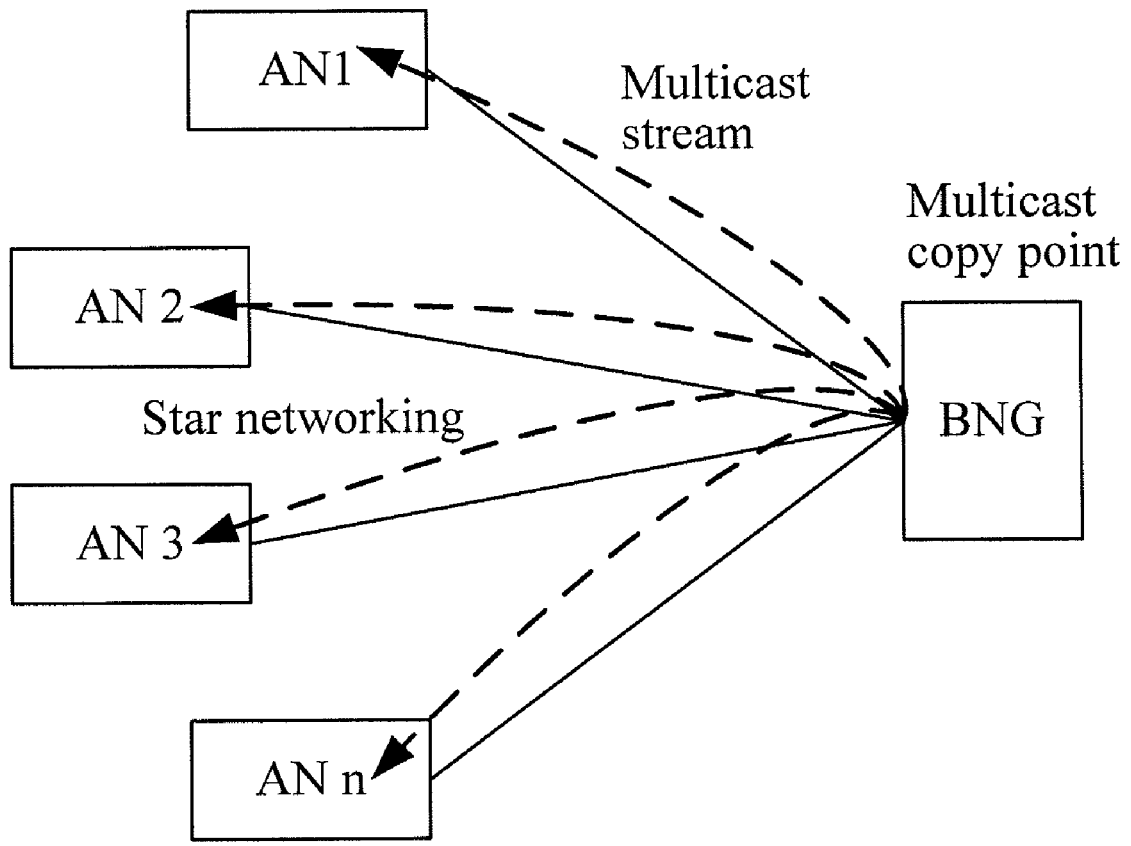
FIG. 2 is a schematic diagram of a multicast and broadcast model with star or tree networking.
Figure 3:
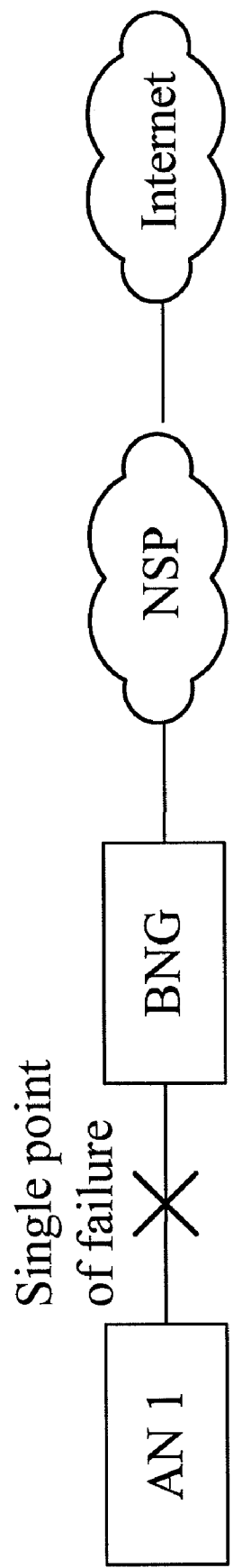
FIG. 3 is a schematic diagram of a network single point of failure.
Figure 4:
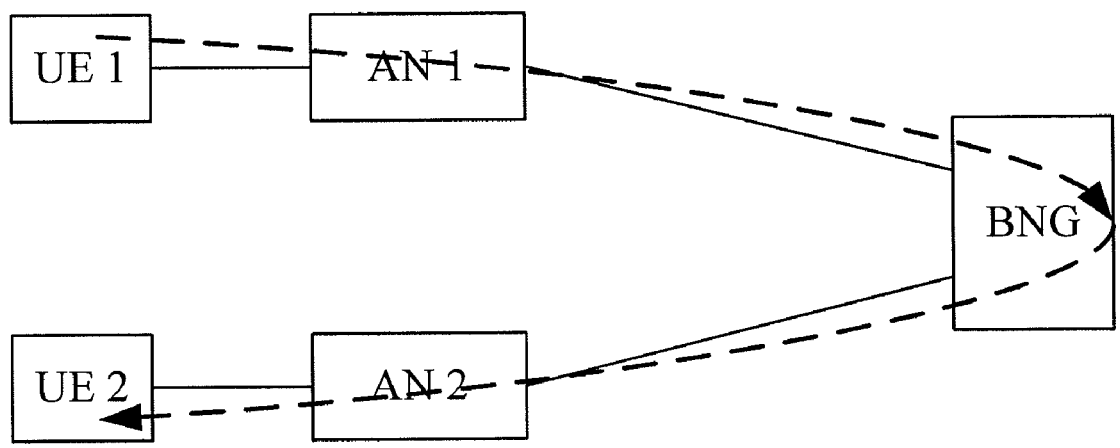
FIG. 4 is a schematic diagram of a path of the communication between users.
Figure 5A:
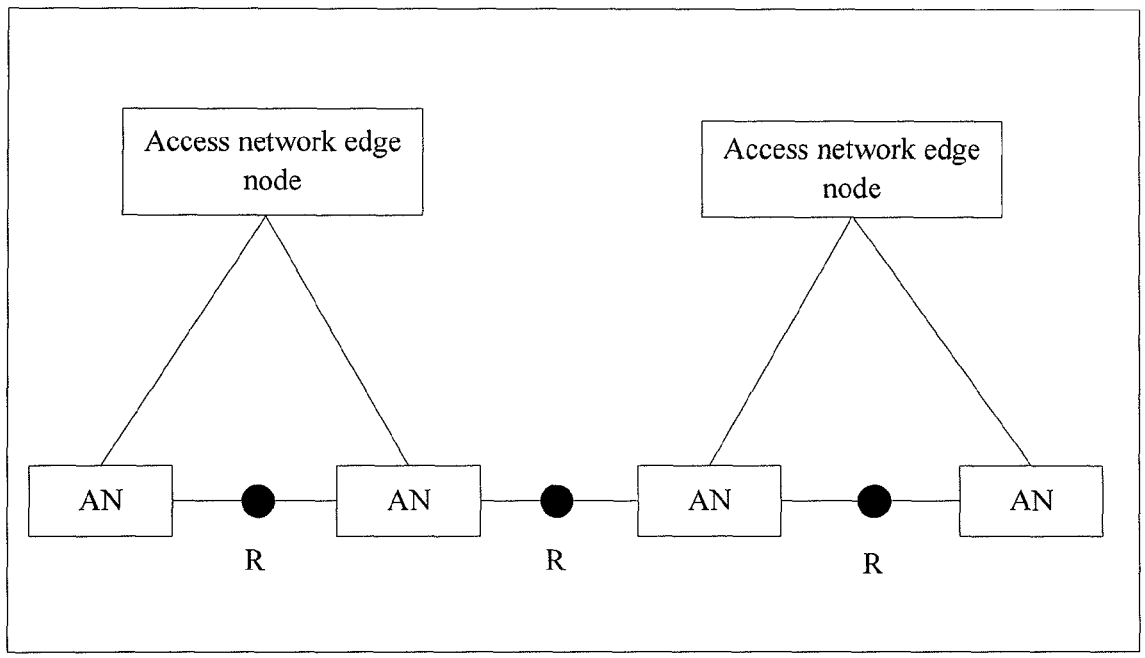
FIG. 5a is a structure diagram of an access network system according to the present invention.

FIG. 5a is a structure diagram of an access network system according to the present invention. The access network system includes: one or more access network edge nodes, and one or more access nodes. Each access network edge node is connected with one or more access nodes. The access node is adapted to enable user terminals to access the access network. Reference points are introduced between the access nodes for supporting connections between the access nodes.

The above access network edge node includes at least one of a broadband remote access server and a broadband network gateway.

The networking between the access network edge nodes and the access nodes may be implemented in at least one of the following modes: star, tree, chain, and ring. The access nodes may be connected with each other in a ring mode.

In the case of unicast service, the networking between the access network edge nodes and the access nodes is implemented in a star or tree mode. In the case of multicast or broadcast service, the networking between the access network edge nodes and the access nodes is implemented in a chain, ring or dual-ring mode.

The access node may be at least one of the following: an access node supporting layer-3 routing, an access node supporting layer-2, an access node supporting IP bridging, and an access node supporting address resolution protocol proxy.

In normal cases, user data is transmitted between the access nodes directly, to support the communication between users in different access nodes. If a single point of failure occurs between an access node and an access network edge node, the access node is connected with the access network edge node via another access node. If a failure occurs between an access node and another access node, the access node is connected with another access node to transmit data via a reverse ring path between the access node and a third access node.

Figure 5B:
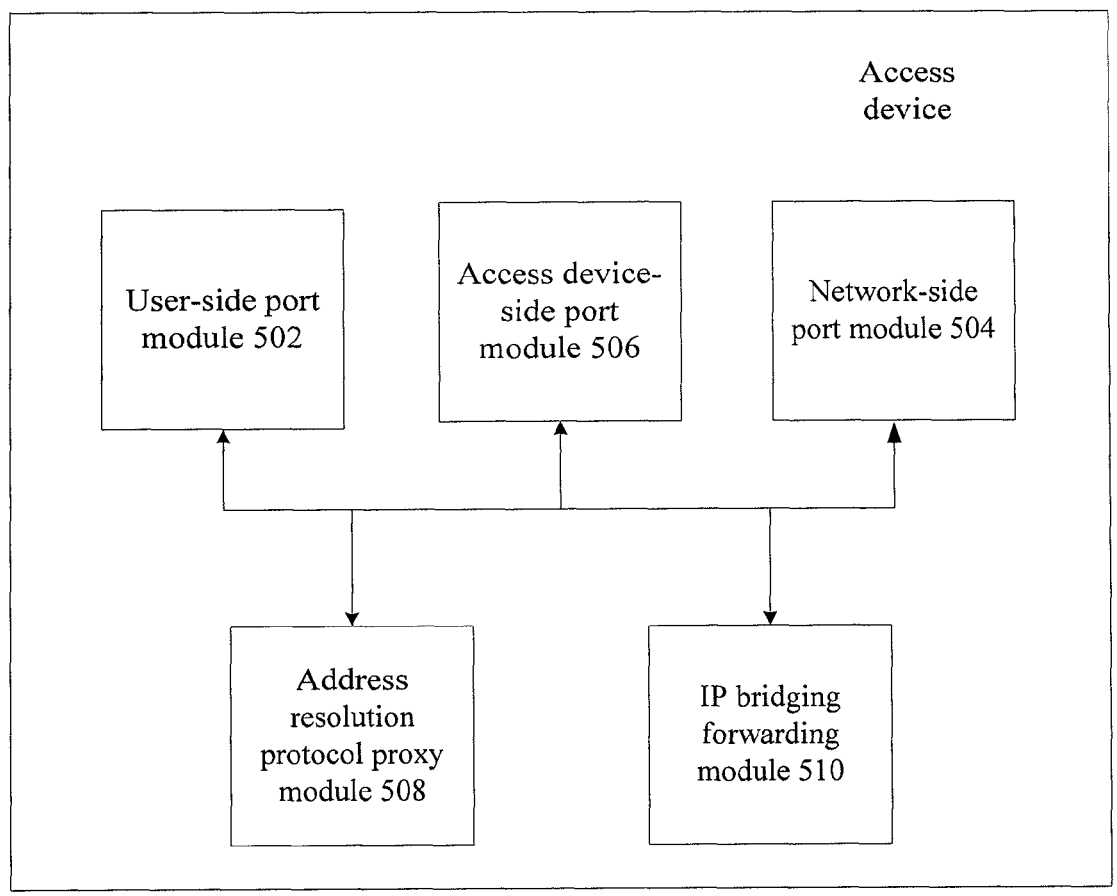
FIG. 5b is a structure diagram of an access device in an access network system according to the present invention.

FIG. 5b is a block diagram of an access device of an access network system according to the present invention. As illustrated in FIG. 5b, the access device of the access network system according to the present invention includes: a user-side port module 502, adapted to communicate with a user terminal; a network-side port module 504, adapted to communicate with an access network edge node; an access device-side port module 506, adapted to communicate with one or more other access devices in the access network system; an address resolution protocol proxy module 508, which is connected to the user-side port module, the network-side port module and the access device-side port module, adapted to proxy-forward an address resolution protocol message; and an IP bridging forwarding module 510, which is connected to the user-side port module, the network-side port module and the access device-side port module, adapted to forward a packet. The packet is data including an IP header and a MAC frame.

The above access network edge node includes at least one of the following: a broadband remote access server and a broadband network gateway. If the access device receives an address resolution protocol request, the address resolution protocol proxy module in the access device forwards the address resolution protocol request to a next access device, and forwards the MAC address of the access device in an address resolution protocol in response to the address resolution protocol request.

The above IP bridging forwarding module stores an IP bridging forwarding table. IP session information in the above IP bridging forwarding table includes: a user-side physical port, a user IP address, and a user MAC address. IP service connection information in the IP bridging forwarding table includes: the MAC address of an access network edge node. The IP service connection information further includes at least one of the following: a network-side physical port and a virtual local area network identifier.

In the IP bridging forwarding table of the access device, the item of a user MAC address of the access device is the MAC address of a previous access device or user terminal connected with the user-side physical port.

In the IP bridging forwarding table of the access device, the item of the MAC address of the access network edge node is the MAC address of a next access device or access network edge node connected with the network-side physical port.

If the access device receives a packet from a user terminal/ an access network edge node/another access device, the access device searches in the IP bridging forwarding table according to the IP address in the packet to obtain IP session information and/or IP service connection information, updates MAC frame header information in the received packet according to the IP session information and/or the IP service connection information, and forwards the updated packet to a next access device.

Figure 6:
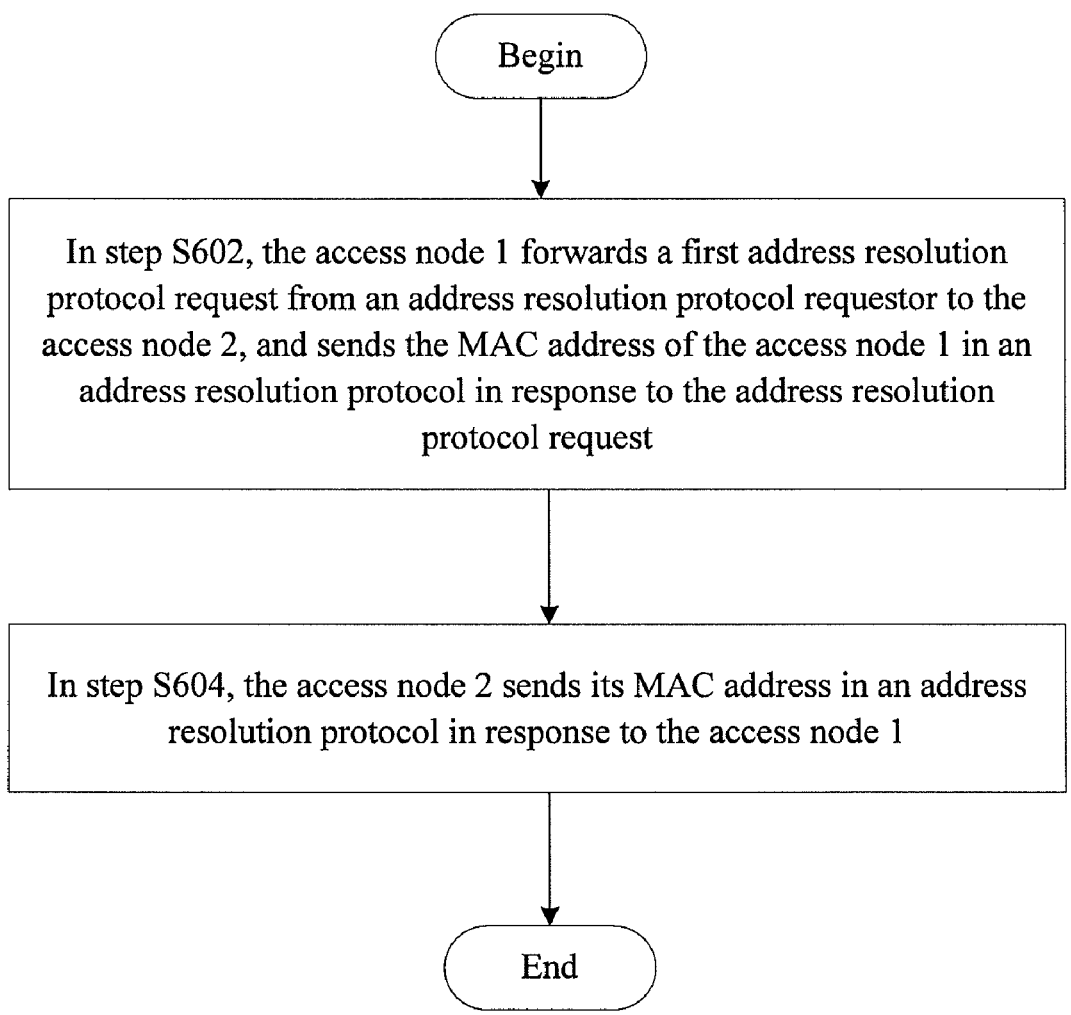
FIG. 6 is a flowchart of an address resolution protocol proxy method utilized in an access network system according to the present invention.

FIG. 6 is a flowchart of an address resolution protocol proxy method utilized in the above access network system according to the present invention. FIG. 6 illustrates an address resolution protocol proxy method between an access node 1 and an access node 2 of multiple access nodes. If packet information is transmitted from a user terminal to a network edge access node in an uplink direction, the method includes the following steps.

In step S602, the access node 1 forwards a first address resolution protocol request from an address resolution protocol requestor to the access node 2, and sends the MAC address of the access node 1 in an address resolution protocol in response to the address resolution protocol request.

In step S604, the access node 2 sends its MAC address in an address resolution protocol in response to the address resolution protocol request from the access node 1.

Figure 7:
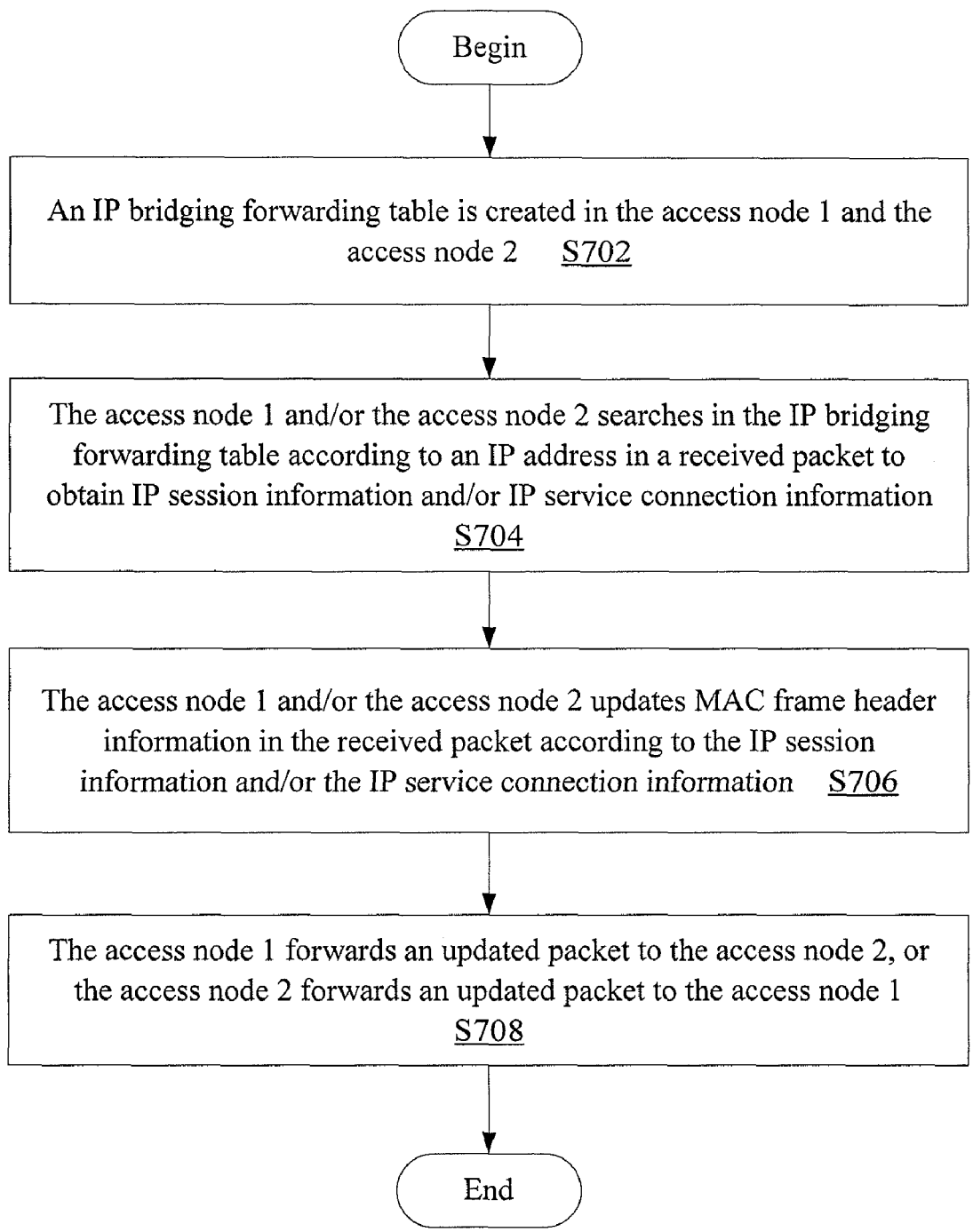
FIG. 7 is a flowchart of an IP bridging forwarding method utilized in an access network system according to the present invention.

FIG. 7 is a flowchart of an IP bridging forwarding method utilized in the above access network system according to the present invention. The IP bridging forwarding method between an access node 1 and an access node 2 of multiple access nodes according to the present invention includes the following steps.

In step S702, an IP bridging forwarding table is created in the access node 1 and the access node 2.

In step S704, the access node 1 and/or the access node 2 searches in the IP bridging forwarding table according to an IP address in a received packet to obtain IP session information and/or IP service connection information.

In step S706, MAC frame header information in the received packet is updated according to the IP session information and/or the IP service connection information.

In step S708, the access node 1 forwards the updated packet to the access node 2, or the access node 2 forwards the updated packet to the access node 1.

Particularly, the access node obtains the MAC address of a user device and address information obtained by an ARP proxy via a Dynamic Host Configuration Protocol (DHCP) message initiated from the user device, so as to create the IP bridging forwarding table.

The IP session information in the IP bridging forwarding table includes: a user-side physical port, a user IP address, and a user MAC address.

In the IP bridging forwarding table of the access node 2, the item of the user MAC address corresponding to the user-side physical port connected with the access node 1 is the MAC address of the access node 1.

The IP service connection information in the IP bridging forwarding table includes: the MAC address of an access network edge node. The IP service connection information further includes at least one of the following: a network-side physical port and a virtual local area network identifier.

In the IP bridging forwarding table of the access node 1, the item of the MAC address of the access network edge node corresponding to the network-side physical port connected with the access node 2 is the MAC address of the access node 2 directed to the access network edge node.

Figure 8A:
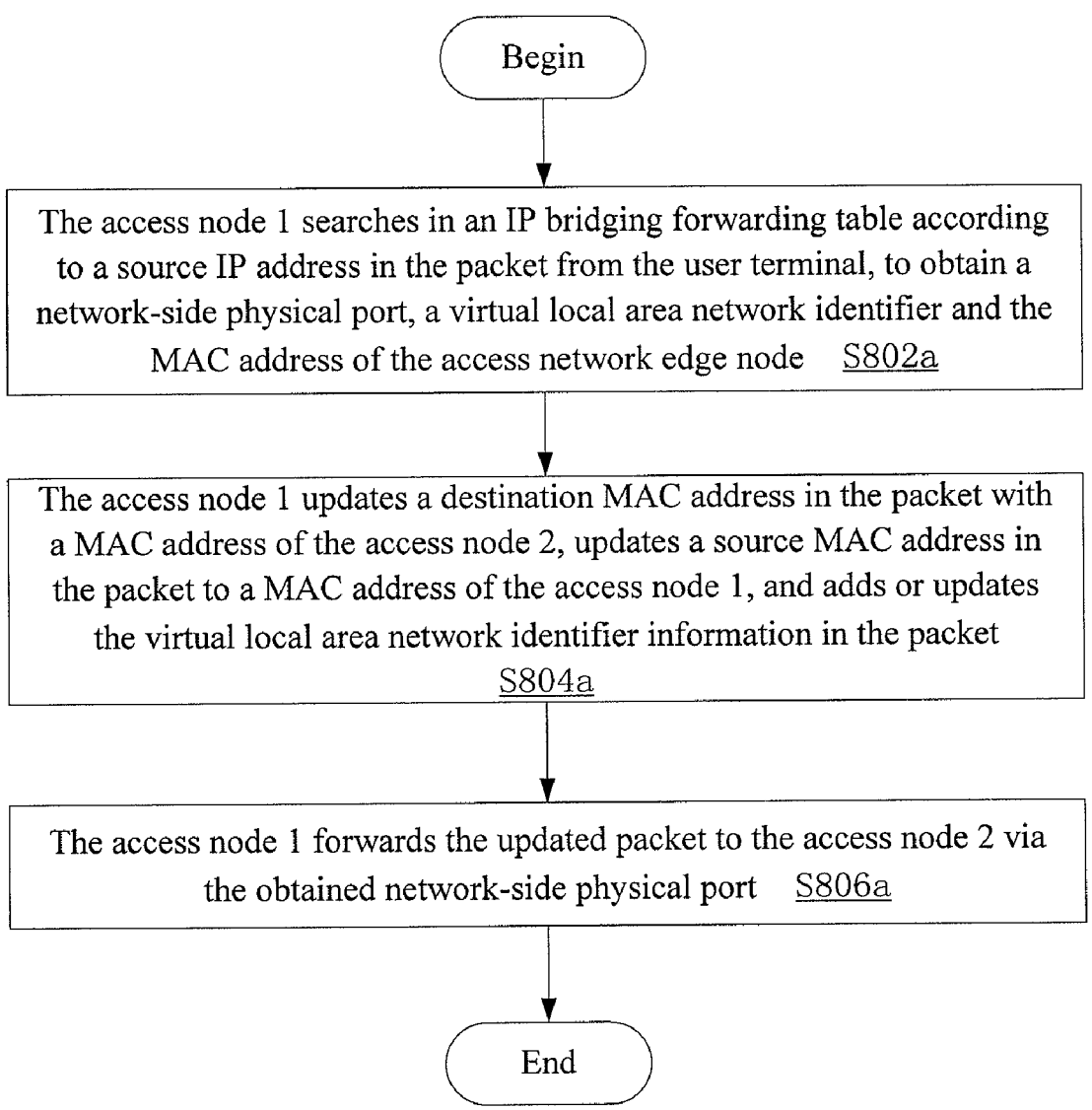
FIG. 8a is another flowchart of an IP bridging forwarding method utilized in an access network system according to the present invention.

As illustrated in FIG. 8a, if a packet is sent from a user terminal to an access network edge node (in an uplink direction) and an access node 1 forwards the packet to an access node 2, an IP bridging forwarding method may include the following steps.

In step S802a, the access node 1 searches in an IP bridging forwarding table according to a source IP address in the packet from the user terminal, to obtain a network-side physical port, a virtual local area network identifier and the MAC address of the access network edge node.

In step S804a, the access node 1 updates a destination MAC address in the packet with the MAC address of the access node 2, updates a source MAC address in the packet with the MAC address of the access node 1, and adds or updates the virtual local area network identifier information in the packet.

In step S806a, the access node 1 forwards the updated packet to the access node 2 via the obtained network-side physical port.

Figure 8B:
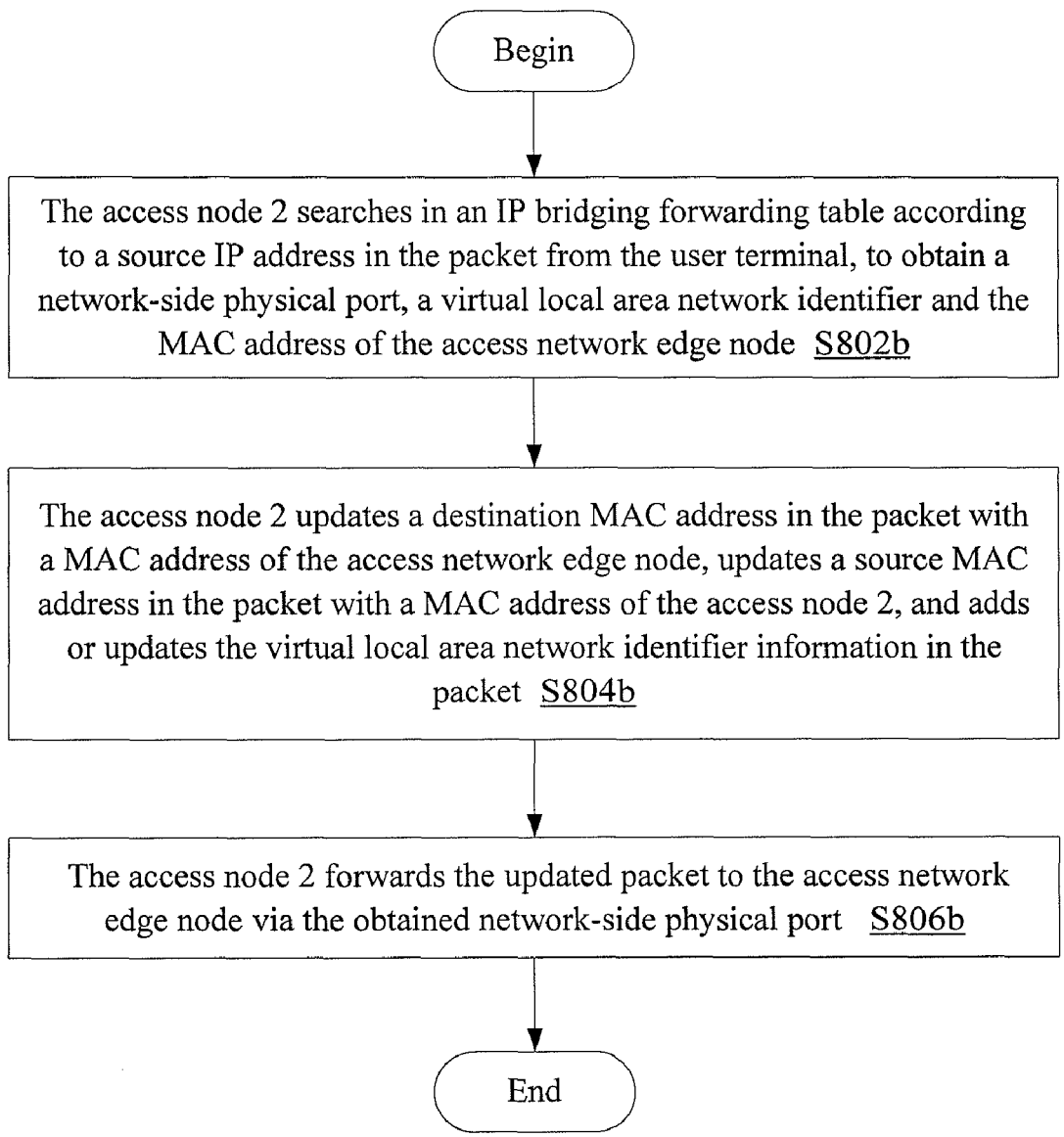
FIG. 8b is another flowchart of an IP bridging forwarding method utilized in an access network system according to the present invention.

As illustrated in FIG. 8b, if a packet is sent from a user terminal to an access network edge node (in an uplink direction) and an access node 2 forwards the packet to the access network edge node, an IP bridging forwarding method may include the following steps.

In step S802b, the access node 2 searches in an IP bridging forwarding table according to a source IP address in the packet from the user terminal, to obtain a network-side physical port, a virtual local area network identifier and a MAC address of the access network edge node.

In step S804b, the access node 2 updates a destination MAC address in the packet with the MAC address of the access network edge node, updates a source MAC address in the packet with the MAC address of the access node 2, and adds or updates the virtual local area network identifier information in the packet.

In step S806b, the access node 2 forwards the updated packet to the access network edge node via the obtained network-side physical port.

Figure 9A:
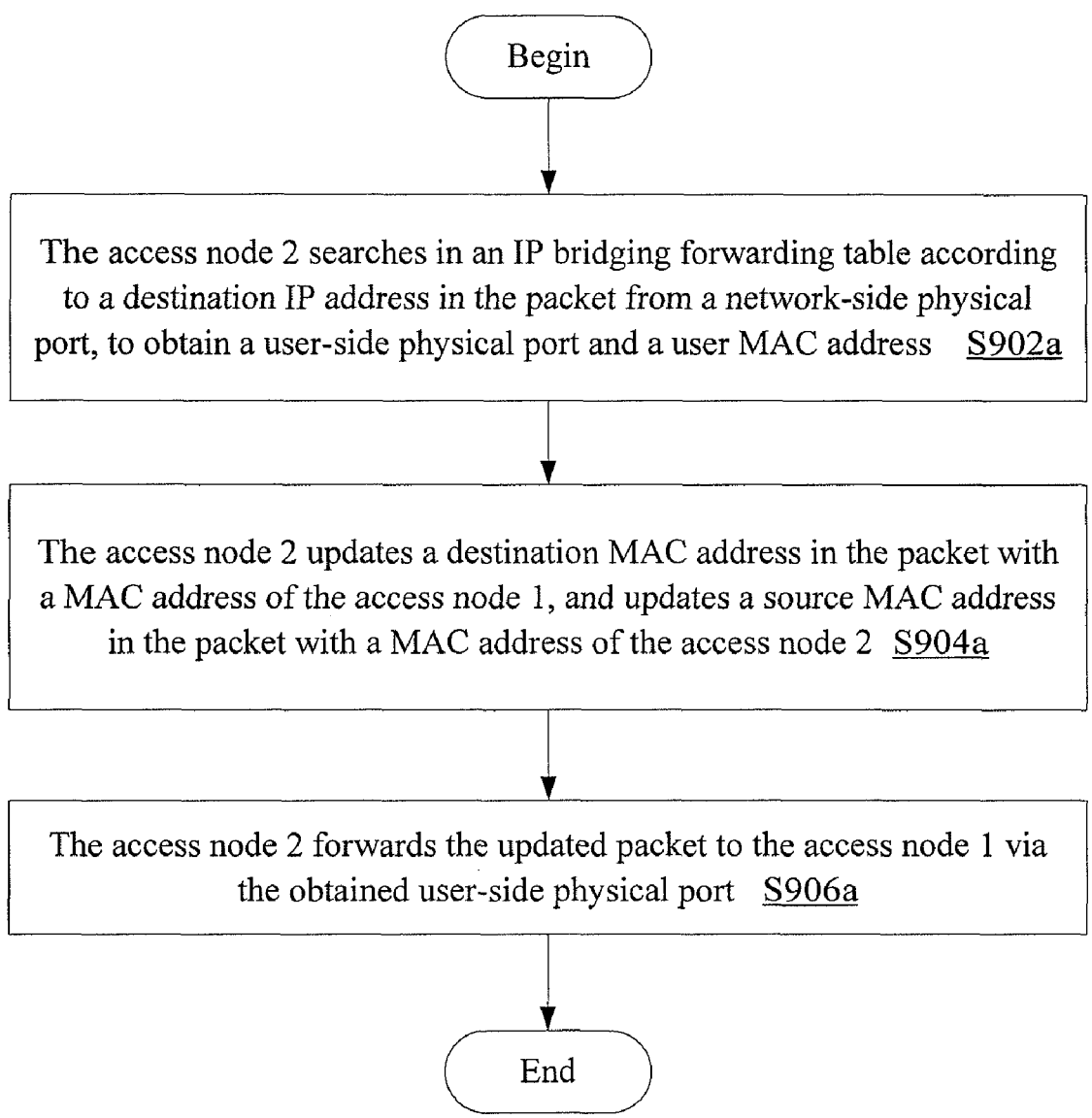
FIG. 9a is a further flowchart of an IP bridging forwarding method utilized in an access network system according to the present invention.

As illustrated in FIG. 9a, if a packet is sent from an access network edge node to a user terminal (in an downlink direction) and an access node 2 forwards the packet to the access node 1, an IP bridging forwarding method may include the following steps.

In step S902a, the access node 2 searches in an IP bridging forwarding table according to a destination IP address in the packet from a network-side physical port, to obtain a user-side physical port and a user MAC address.

In step S904a, the access node 2 updates a destination MAC address in the packet with the MAC address of the access node 1, and updates a source MAC address in the packet with the MAC address of the access node 2.

In step S906a, the access node 2 forwards the updated packet from the obtained user-side physical port to the access node 1.

Figure 9B:
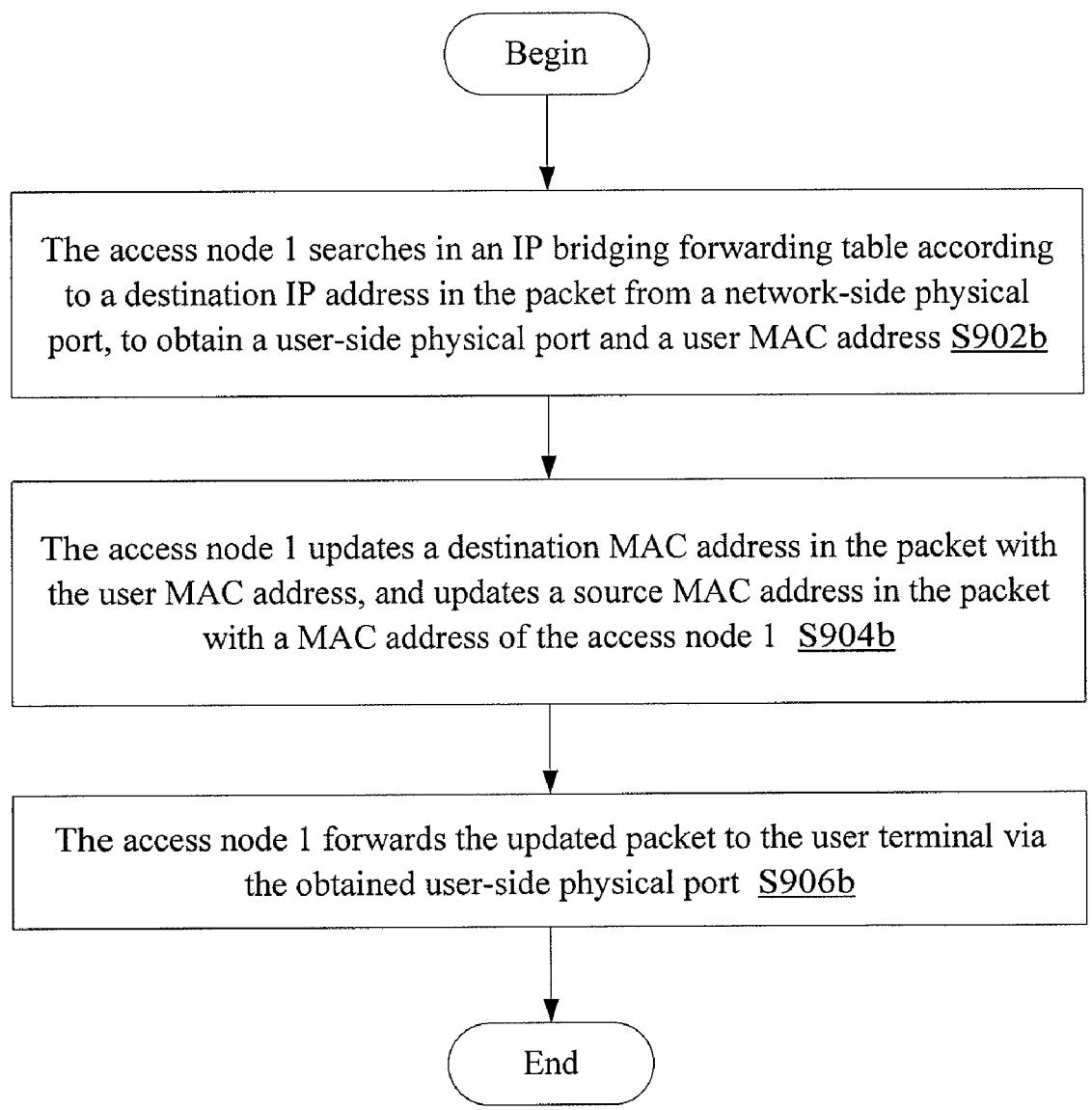
FIG. 9b is a further flowchart of an IP bridging forwarding method utilized in an access network system according to the present invention.

As illustrated in FIG. 9b, if a packet is sent from an access network edge node to a user terminal (in an downlink direction) and an access node 1 forwards the packet to the user terminal, an IP bridging forwarding method may include the following steps.

In step S902b, the access node 1 searches in an IP bridging forwarding table according to a destination IP address in the packet from a network-side physical port, to obtain a user-side physical port and a user MAC address.

In step S904b, the access node 1 updates a destination MAC address in the packet with the user MAC address, and updates a source MAC address in the packet with the MAC address of the access node 1.

In step S906b, the access node 1 forwards the updated packet to the user terminal via the obtained user-side physical port.

As can be seen from the above, a reference point R is introduced between ANs according to the present invention, so that the ANs can connect with each other to constitute a new single-edge or multi-edge access network reference architecture.

For multicast or broadcast service, the present invention may adopt a chain, ring or dual-ring networking path (BNG->AN1->AN2->AN3 . . . ->ANn) to transmit broadcast or multicast data streams. For unicast service, the present invention may adopt a star or tree networking path to transmit unicast data streams. The BRAS/BNG and the aggregation network do not need to support multicast copy, and multicast or broadcast service can be provided only if the ANs are connected with each other, thereby reducing multicast or broadcast traffic greatly in the network.

If a single point of failure occurs in a connection between an AN and the BRAS/BNG, the connection can be switched to another AN link because the ANs can be connected with each other, thereby implementing a multi-homing function.

The present invention can meet the requirements of future VoIP and Peer-to-Peer communications. The traffic between users covered by different ANs may be transferred at the data plane not via the BRAS/BNG but via interfaces between the ANs. Therefore, the delay can be reduced and the communication path can be shortened evidently, to prevent the BRAS/BNG from becoming a bottleneck for communications.

An AN supporting layer-3 routing or an AN supporting IP bridging may be adopted in the present invention.

Technical solutions of the present invention are described with reference to the attached drawings as follows.

Figure 10:
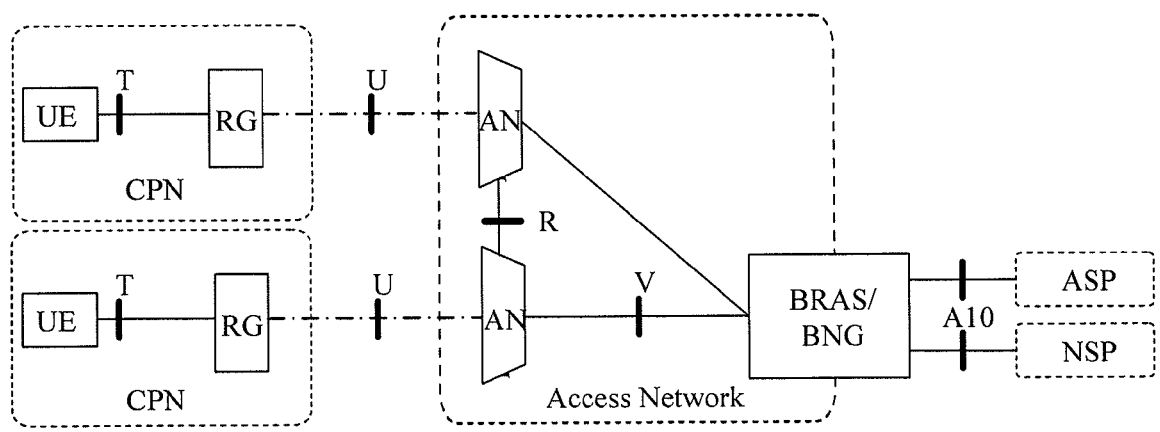
FIG. 10 is a schematic diagram of a single-edge access network reference architecture according to the present invention.
Figure 11:
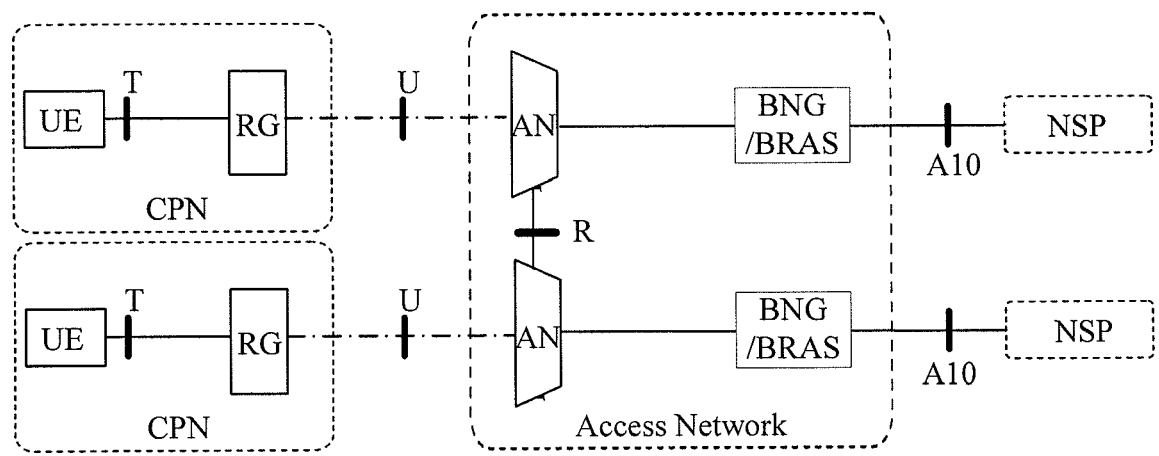
FIG. 11 is a schematic diagram of a multi-edge access network reference architecture according to the present invention.
Figure 12A:
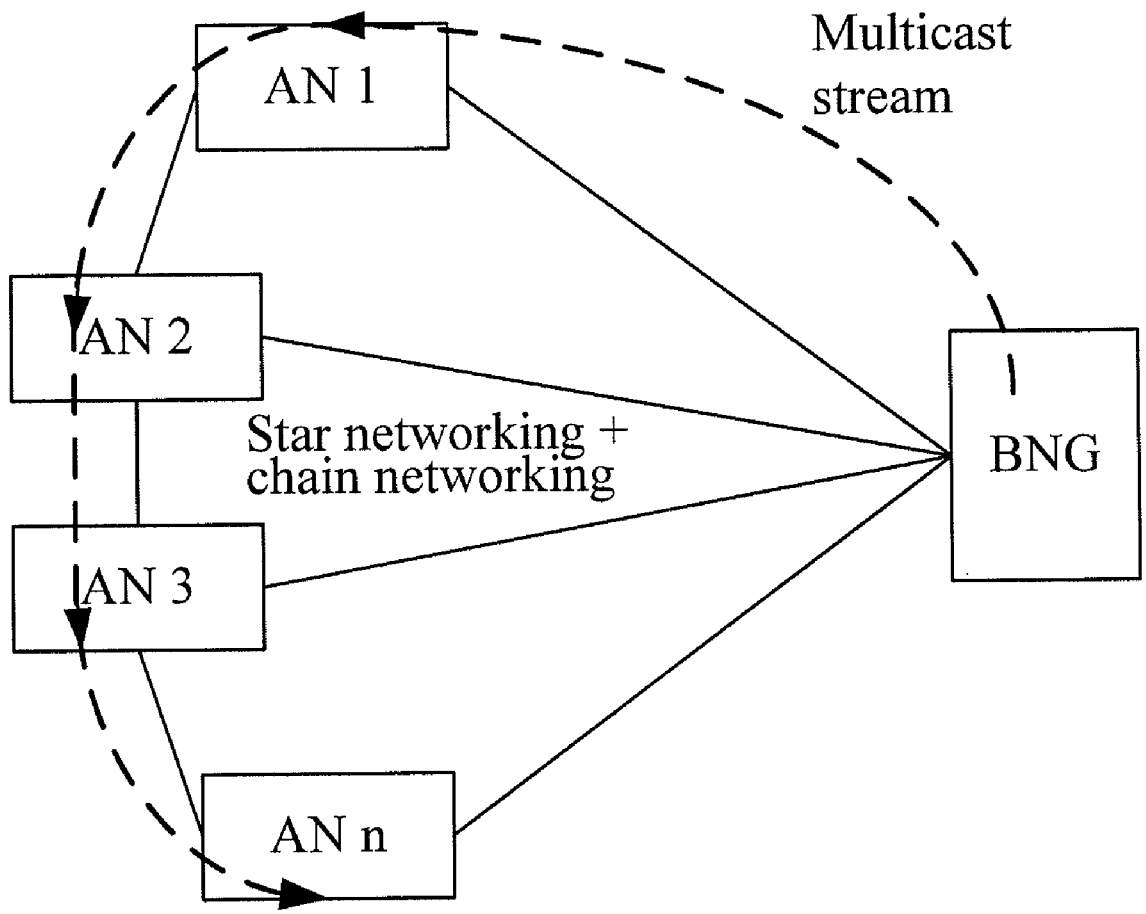
FIG. 12a, FIG. 12b, FIG. 12c and FIG. 12d are schematic diagrams of chain or ring networking multicast and broadcast models according to the present invention.
Figure 12B:
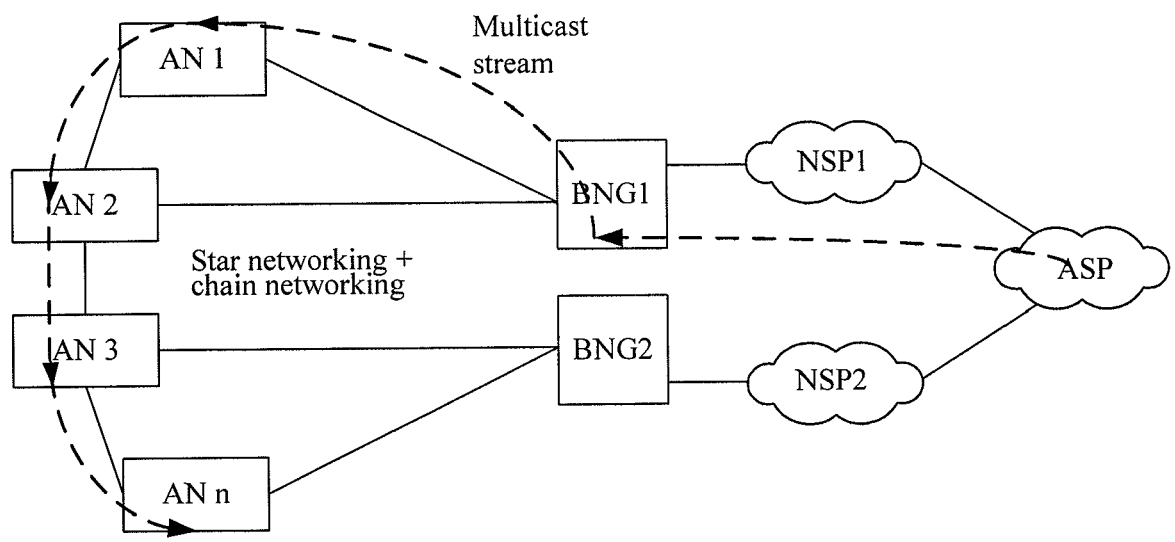
Figure 12C:
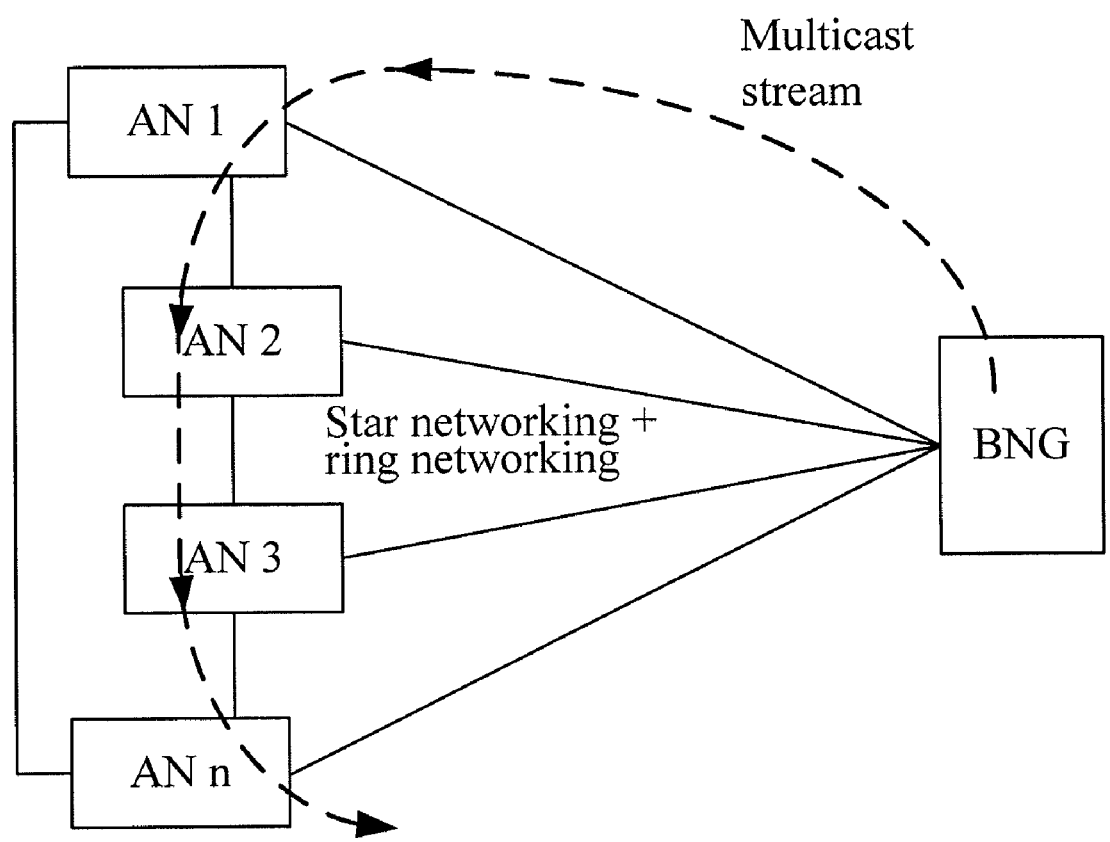
Figure 12D:
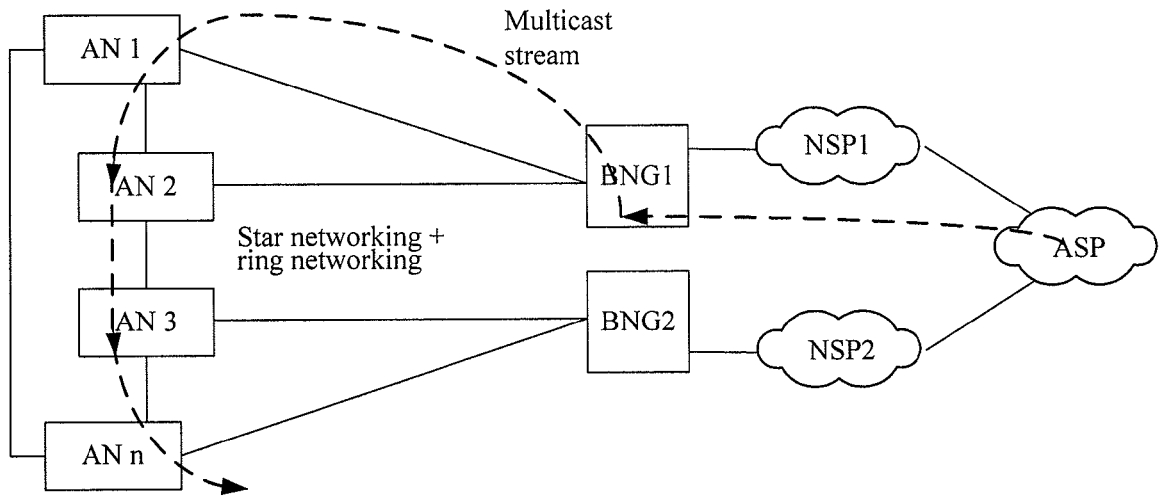

According to the present invention, a reference point R is introduced between ANs, so that the ANs can connect with each other. A single-edge access network reference architecture is illustrated in FIG. 10. In addition, a multi-edge access network reference architecture is illustrated in FIG. 11, in which a reference point R is introduced similarly.

In the access network architecture according to the present invention, star or tree and chain or ring hybrid networking may be adopted between an AN (i.e., DSLAM or OLT) of the DSL network and the BRAS/BNG, as illustrated in FIG. 12. As illustrated in FIG. 12(a) and FIG. 12(b), a chain, ring or dual-ring networking path (BNG->AN1->AN2->AN3 . . . ->ANn) may be adopted to transmit multicast or broadcast data streams, and a star or tree networking path may be adopted to transmit unicast data streams. As illustrated in FIG. 12(c) and FIG. 12(d), a ring networking path may be adopted to transmit multicast or broadcast data streams. The BRAS/BNG and the aggregation network do not need to support multicast copy, and multicast or broadcast service can be provided only if the ANs are connected with each other, thereby reducing multicast or broadcast traffic greatly in the network.

Figure 13A:
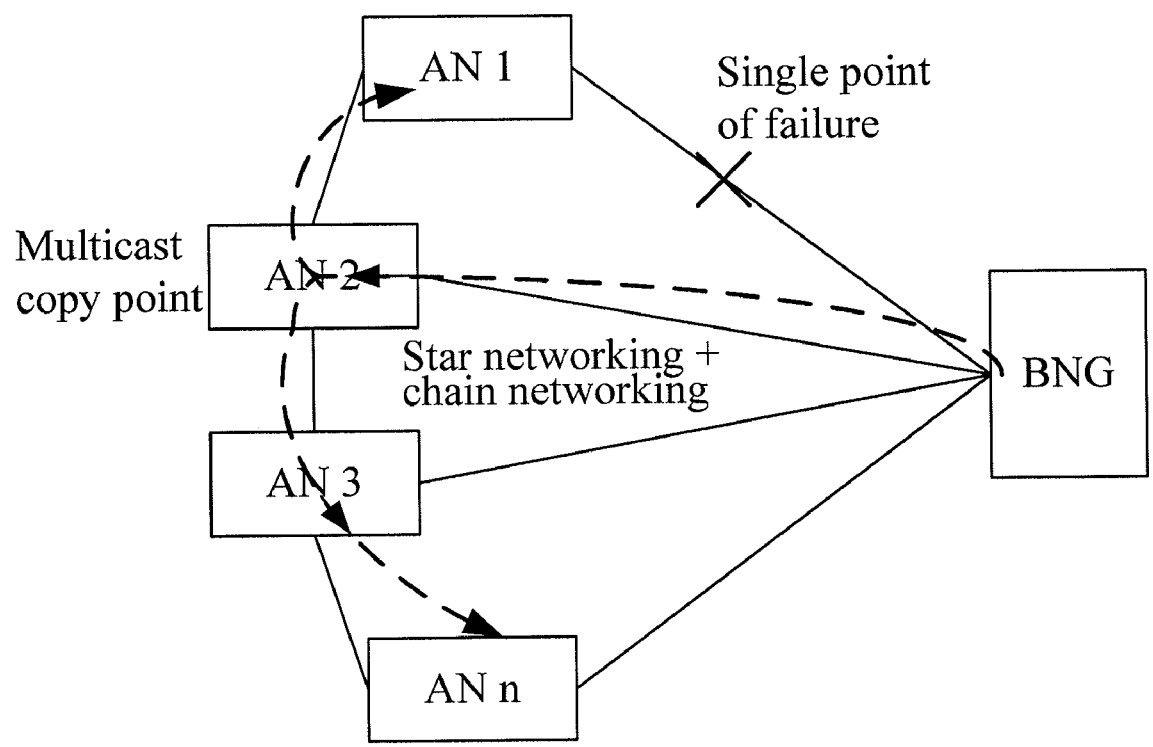
FIG. 13a and FIG. 13b are schematic diagrams of chain networking multicast and broadcast failure models according to the present invention.
Figure 13B:
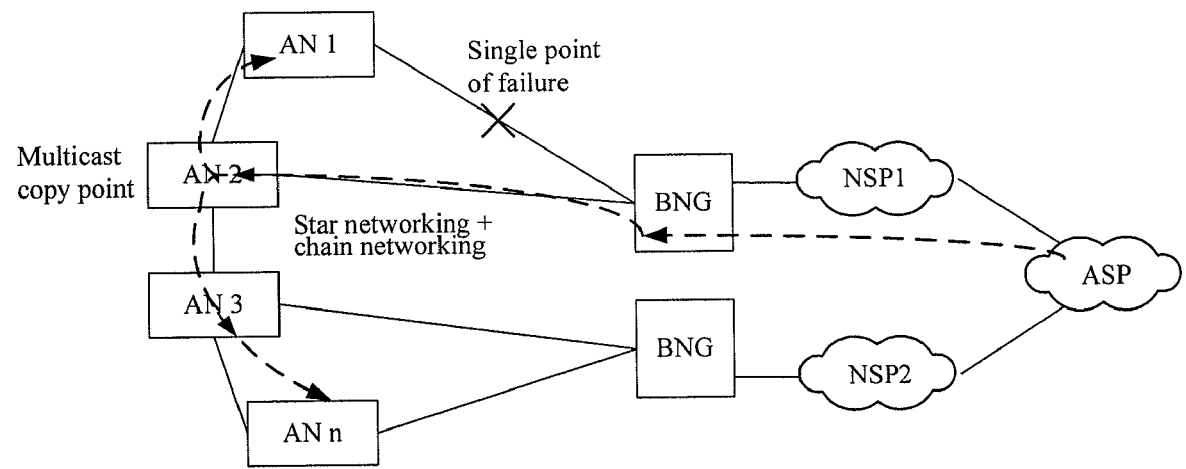
Figure 14A:
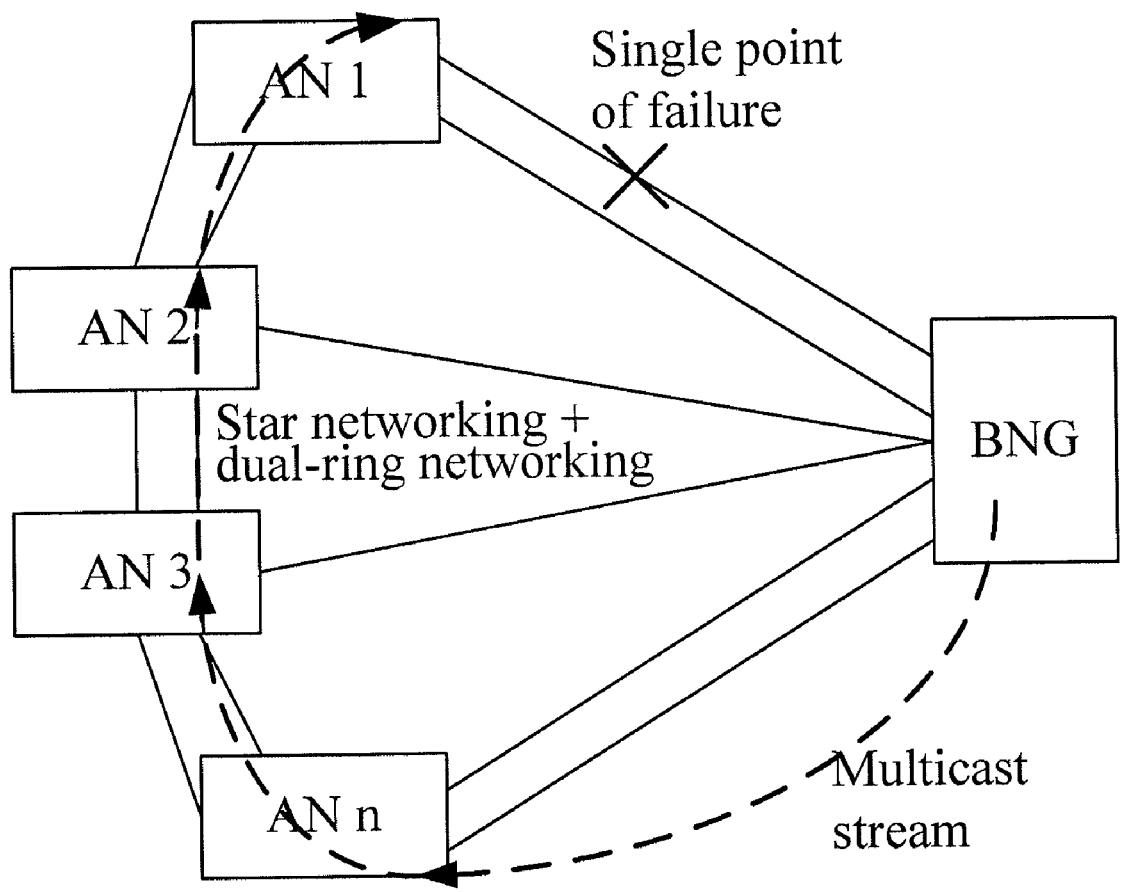
FIG. 14a, FIG. 14b, FIG. 14c and FIG. 14d are schematic diagrams of dual-ring networking multicast and broadcast failure models according to the present invention.
Figure 14B:
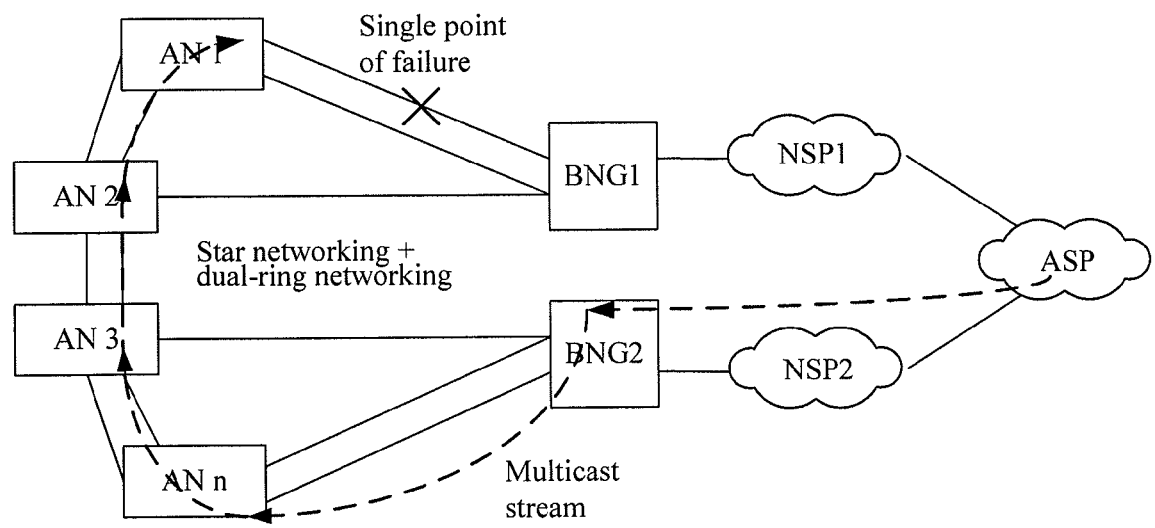
Figure 14C:
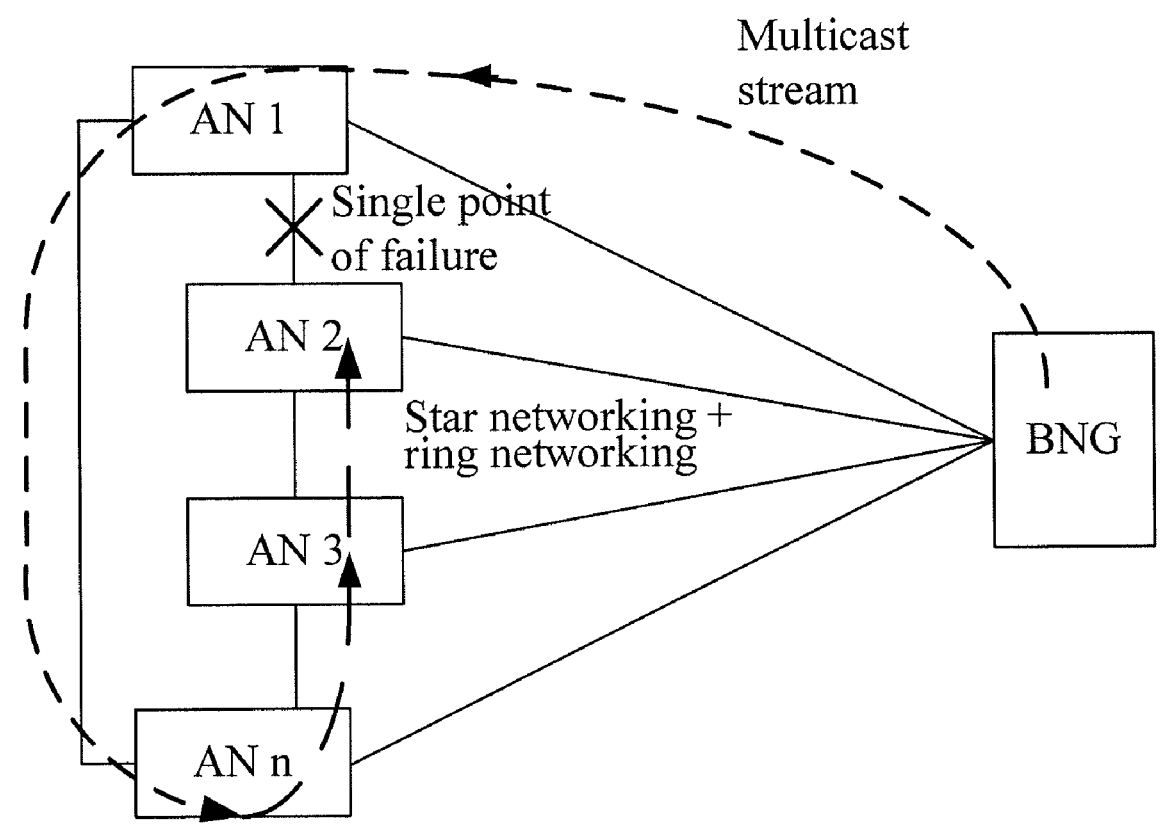
Figure 14D:
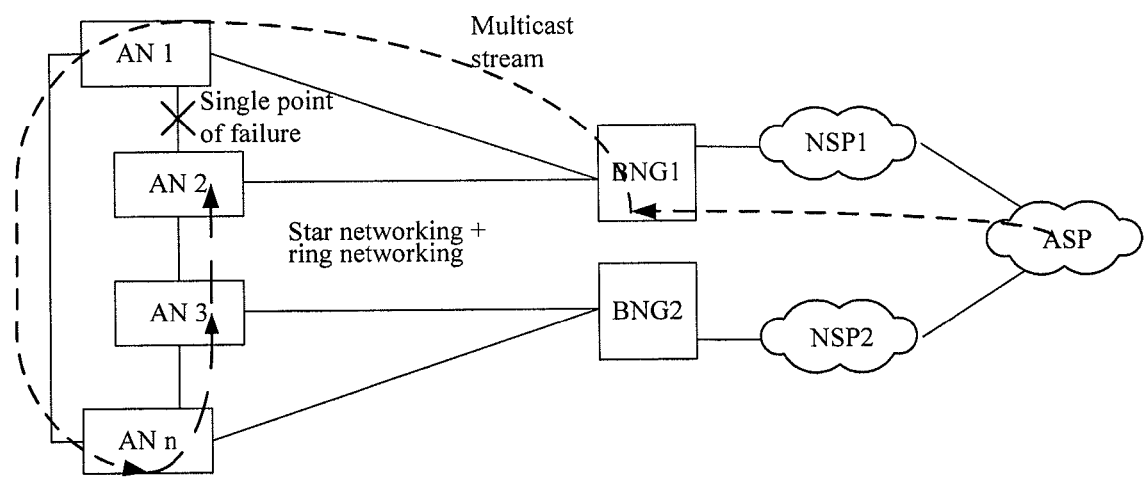

For multicast or broadcast service, assuming that if a single point of failure occurs on the BNG->AN1 path as illustrated in FIG. 13(a) and FIG. 13(b), a chain networking path (BNG->AN2->AN3 . . . ->Ann; AN2->AN1) according to the present invention may be adopted to transmit multicast or broadcast data streams, here AN2 is a multicast copy point; or as illustrated in FIG. 14(a) and FIG. 14(b), a second ring networking path of a dual-ring (BNG->ANn-> . . . AN3-> AN2->An1) may be adopted to transmit multicast or broadcast data streams; if a single point of failure occurs on the AN1->AN2 path as illustrated in FIG. 14(c) and FIG. 14(d), an inverse networking path of a ring (BNG->AN1->ANn . . . AN3->AN2) may be adopted to transmit multicast or broadcast data streams. This shows the flexibility of chain or ring networking which supports multicast or broadcast service.

Figure 15:
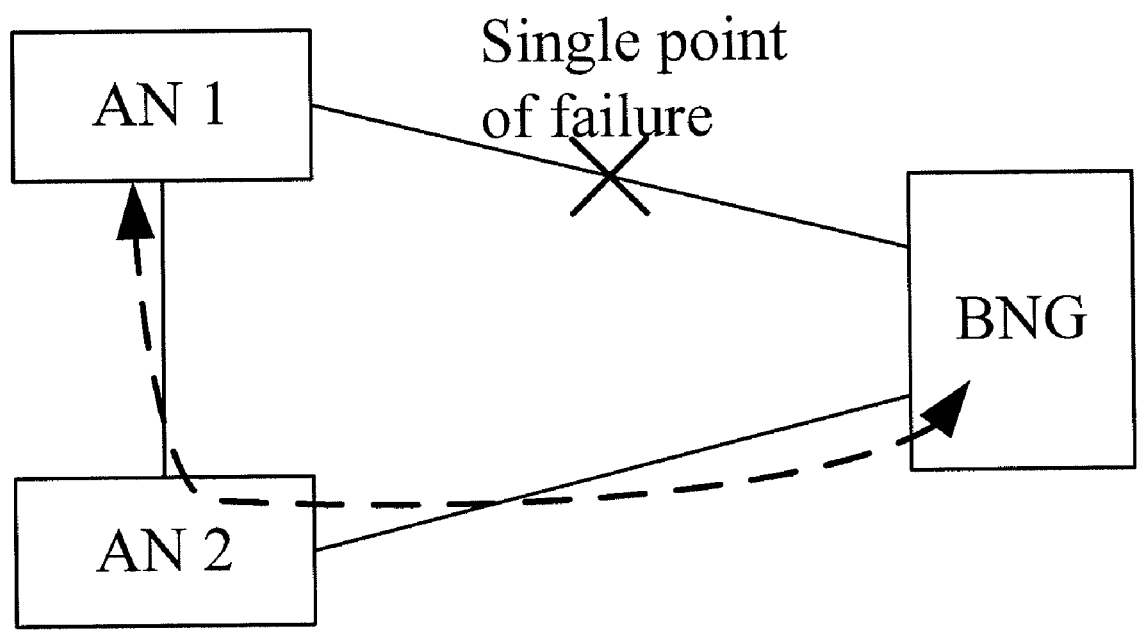
FIG. 15 is a schematic diagram of a networking unicast failure model 1 according to the present invention.
Figure 16:
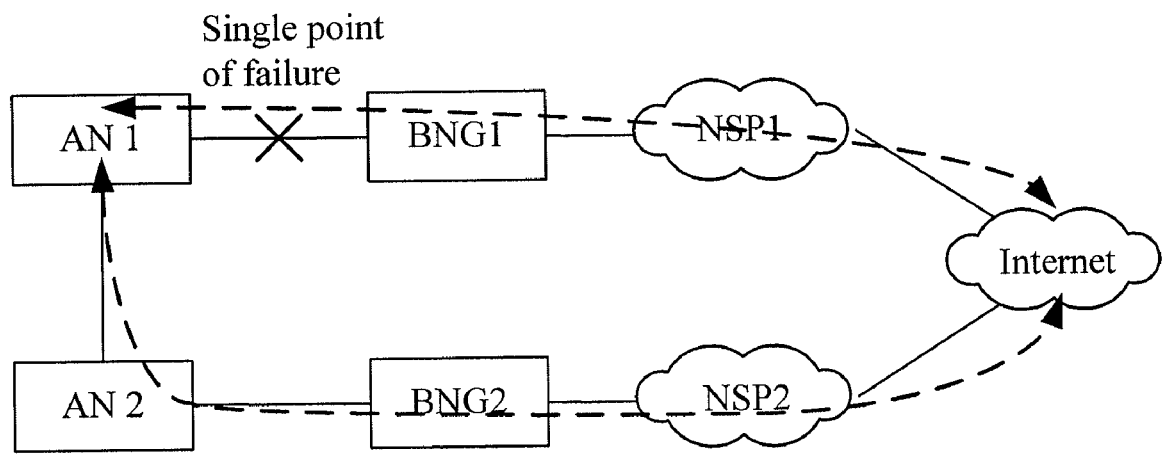
FIG. 16 is a schematic diagram of a networking unicast failure model 2 according to the present invention.

For unicast service, if a single point of failure occurs on the BNG->AN1 path as illustrated in FIG. 15, a networking path (BNG->AN2->AN1) according to the present invention may be adopted to transmit unicast data streams to implement a multi-homing function; or as illustrated in FIG. 16, a networking path (NSP2->BNG->AN2->AN1) according to the present invention may be adopted to transmit unicast data streams to implement a multi-homing function.

Figure 17A:
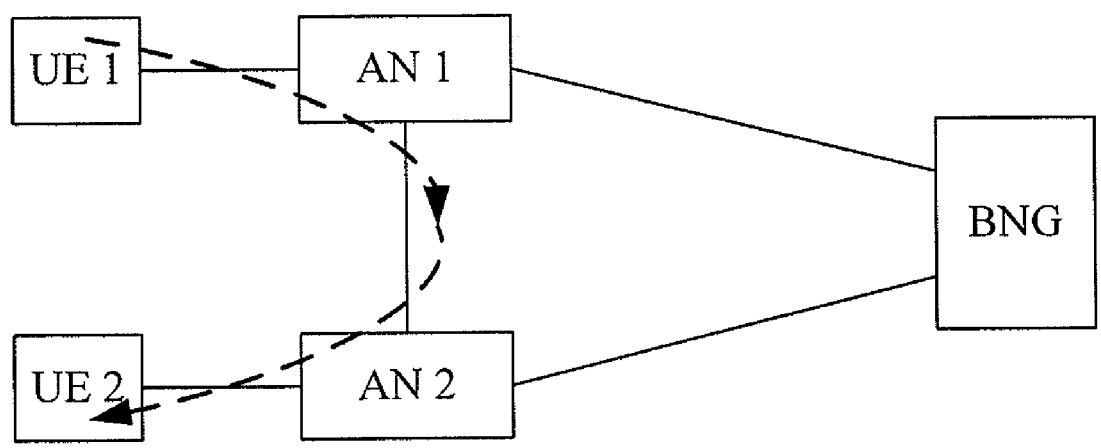
FIG. 17a and FIG. 17b are schematic diagrams of paths for communications between users.
Figure 17B:
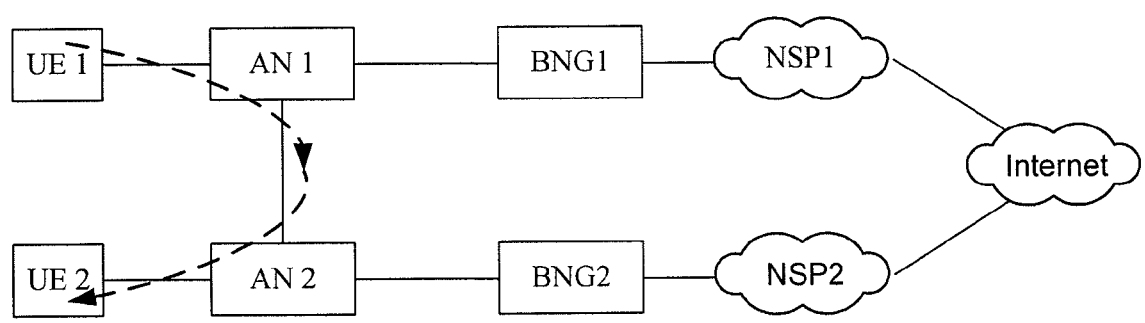

For meeting the requirements of future VoIP and Peer-to-Peer communications, for the traffic between users covered by different ANs, control signaling may still passes through the BRAS/BNG, but packet data on the data plane may be transferred not via the BRAS/BNG but via interfaces between the ANs directly as illustrated in FIG. 17(a) and FIG. 17(b). Therefore, the delay can be reduced and the communication path can be shortened evidently, to prevent the BRAS/BNG from becoming a bottleneck of communications.

Figure 18:
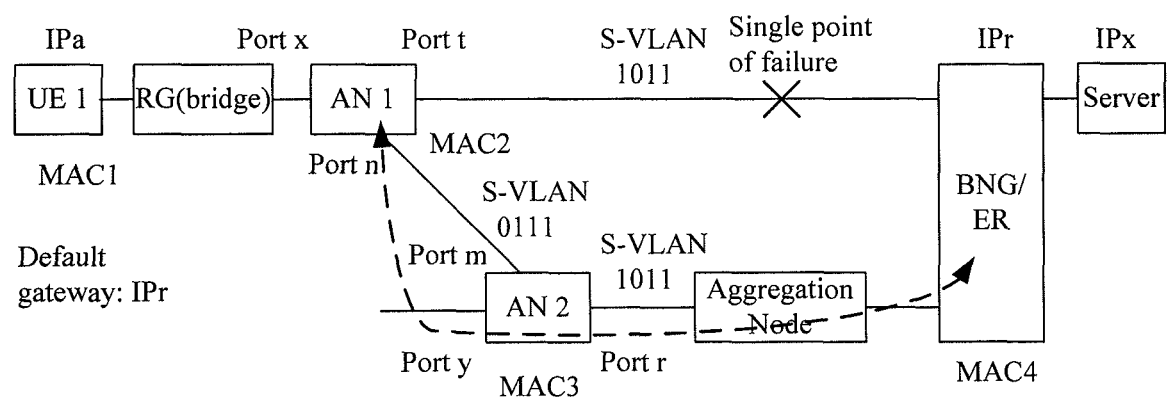
FIG. 18 is a schematic diagram of IP bridging in an access network reference architecture according to the present invention.

In the unicast models in FIG. 15 and FIG. 16, ANs supporting layer-3 routing or ANs supporting IP bridging may be adopted. As illustrated in FIG. 18, assuming that the RG is a layer-2 bridging device, the IP address of UE1 is IPa, the IP address of BNG/ER is IPr (a default gateway of a user), the IP address of a party peer to the UE (the Server in FIG. 18) is IPx, the MAC address of UE1 is MAC1, the MAC address of AN1 is MAC2, the MAC address of AN2 is MAC3, the MAC address of BNG/BRAS/ER is MAC4; the interworking port n of AN1 is connected with the interworking port m of AN2, the AN1 user port connected with the UE1 is port x, the AN1 is connected uplink via the port t, the AN2 is connected uplink via the port r. If a single point of failure occurs on the BNG->AN1 path, the connection will be switched to the BNG->AN2 path.

Figure 19:
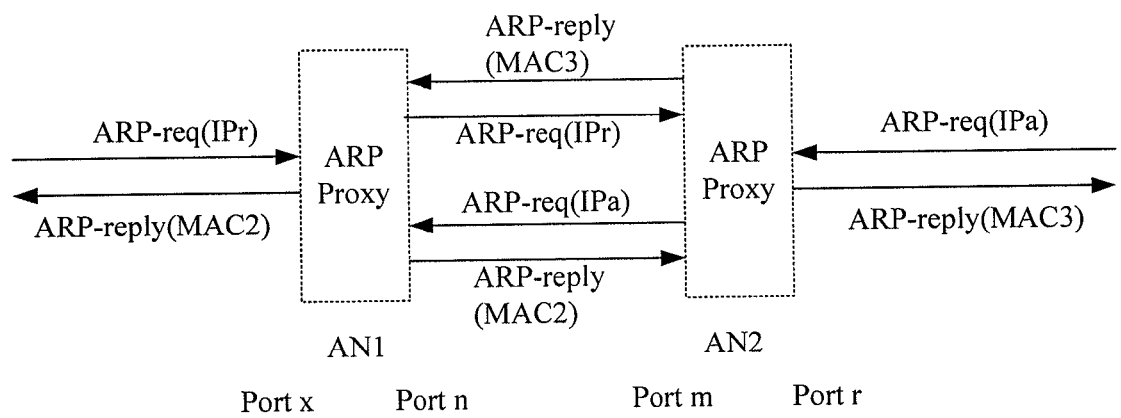
FIG. 19 is a schematic diagram of an ARP proxy in an access network reference architecture according to the present invention.

The AN provides an Address Resolution Protocol Proxy (ARP Proxy) function. As illustrated in FIG. 19, the AN1 forwards an ARP request (ARP-req) from the AN1 user port x to the AN2, and the AN2 responds an ARP reply (ARP-reply) including the MAC address MAC3 of AN2 to the AN1; the AN2 forwards an ARP request (ARP-req) from the port r to the AN1, the AN2 responds an ARP reply (ARP-reply) including the MAC address MAC3 of AN2 via the port r, and the AN1 responds an ARP reply (ARP-reply) including the MAC address MAC2 of AN1 to the AN2.

The AN may obtain the MAC address of a user device and address information obtained by an ARP proxy via a Dynamic Host Configuration Protocol (DHCP) message initiated by the user device, so as to create an IP bridging forwarding table. Therefore, an IP bridging forwarding table based on IP session in the AN, as illustrated in tables 1 to 2 Particularly, the IP session is represented by a use-side physical port, a user IP address and a user MAC address; an IP service connection is represented by a network-side physical port, a virtual local area network identifiers S-VLAN and the BNG MAC address.

The S-VLAN may be configured statically or dynamically. In table 1, the MAC address corresponding to the IP address of a user connected with the interworking port m of AN2 is not the user's MAC address, but the MAC address of the AN covering the user. In table 2, the MAC address corresponding to the IP address of a user connected with the interworking port n of AN1 is not the MAC address of the BNG which the user belongs to, but the MAC address of the AN connected with the interworking port n of AN1.

TABLE 1

IP bridging forwarding table of AN2

| IP session | | | IP service connection | | |
|---|---|---|---|---|---|
| User-side physical port | User IP address | User MAC address | Network-side physical port | S-VLAN | BNG MAC address |
| m | IPa | MAC2 (MAC address of a next AN) | r | 1011 | MAC4 |
| y | ... | ... | r | 1011 | MAC4 |

TABLE 2

IP bridging forwarding table of AN1

| IP session | | | IP service connection | | |
|---|---|---|---|---|---|
| User-side physical port | User IP address | User MAC address | Network-side physical port | S-VLAN | BNG MAC address |
| ... | ... | ... | t | 1011 | MAC4 |
| x | IPa | MAC1 | n | 0111 | MAC3 (MAC address of a next AN) |

Figure 20:
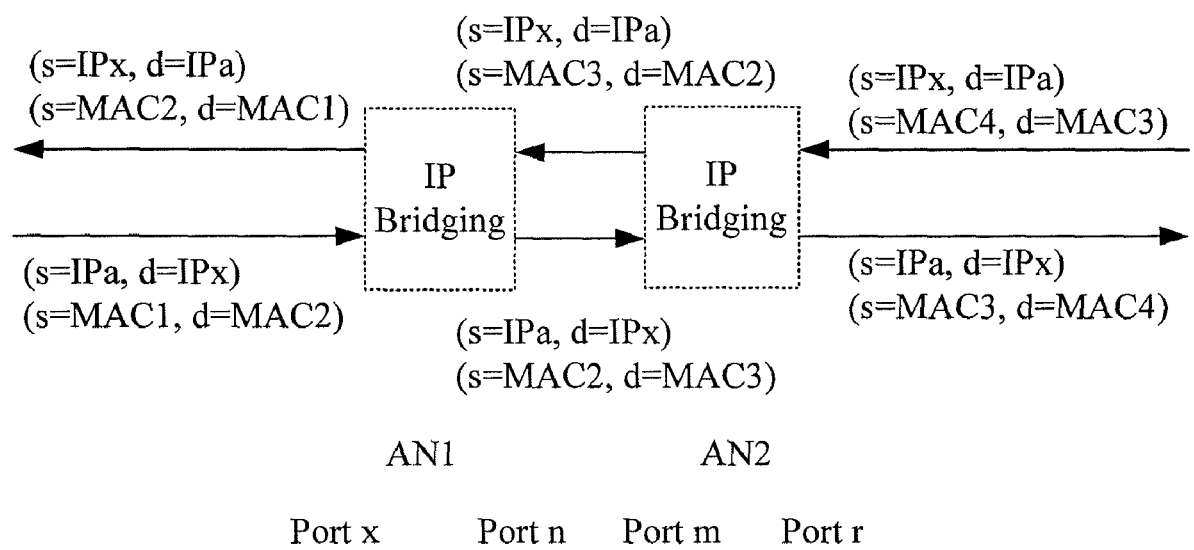
FIG. 20 is a schematic diagram of IP bridging in reference architecture according to the present invention.

The IP bridging procedure in the access network reference architecture according to the present invention is illustrated in FIG. 20, in which the parentheses denote a packet of a certain layer. Particularly, the packet including IP addresses is an IP packet, and the packet including MAC addresses is a MAC frame.

In the Uplink Direction:

For a packet (including a MAC frame and an IP packet header) from a user-side port of the AN1, the AN1 searches in an IP bridging forwarding table of the AN1 (i.e., table 2) according to a source IP address of the IP packet (IPa in this example) to obtain a network-side physical port (port n in this example), S-VLAN (0111 in this example) and a BNG MAC address (MAC3 in this example), modifies a destination address of the MAC frame of the packet to MAC3, modifies the source address to the MAC address of AN1, MAC2, and adds or modifies the S-VLAN in the MAC frame to '0111'; then forwards the packet to the AN2 via the port n, thereby accomplishing IP bridging at this node. Alternatively, the port n is bound with a specific S-VLAN value in a default manner, e.g., '0111'. The IP service connection is represented only by the S-VLAN and the BNG MAC address. If the S-VLAN '0111' is obtained by search, it is default that the packet is forwarded by the port n; if another S-VLAN is obtained by search, it is default that the packet is forwarded by the port t.

For a packet (including a MAC frame and an IP packet header) from a user-side port of the AN2, the AN2 searches in an IP bridging forwarding table of the AN2 (i.e., table 1) according to a source IP address of the IP packet (IPa in this example) to obtain a network-side physical port (port r in this example), S-VLAN (1011 in this example) and a BNG MAC address (MAC4 in this example), modifies a destination address of the MAC frame of the packet to MAC4, modifies the source address to the MAC address of AN2, MAC3, and adds or modifies the S-VLAN in the MAC frame to '1011'; then forwards the packet to the BNG via the port r, thereby accomplishing IP bridging at this node.

In the Downlink Direction:

For a packet (including a MAC frame and an IP packet header) from a network-side port of the AN2, the AN2 searches in an IP bridging forwarding table of the AN2 (i.e., table 1) according to a destination IP address of the IP packet (IPa in this example) to obtain a user-side physical port (port m in this example) and a user MAC address (MAC2 in this example), modifies a destination address of the MAC frame of the packet to MAC2, modifies a source address of the MAC frame to the MAC address of AN2, MAC3, and forwards the packet to the AN1 via the port m, thereby accomplishing IP bridging at this node.

For a packet (including a MAC frame and an IP packet header) from a network-side port of the AN1, the AN1 searches in an IP bridging forwarding table of the AN1 (i.e., table 2) according to a destination IP address of the IP packet (IPa in this example) to obtain a user-side physical port (port x in this example) and a user MAC address (MAC1 in this example), modifies a destination address of the MAC frame of the packet to MAC1, modifies a source address of the MAC frame to the MAC address of AN1, MAC2, and forwards the packet to the user via the port x, thereby accomplishing IP bridging at this node.

The above description is for the embodiments of the present invention, which shall not limit the scope of the present invention. It is apparent to those skilled in the art that various variations and substitutes may be easily made to the present invention within the scope of the present invention as defined in the appended claims.

What is claimed is:

1. An access network system, comprising:
one or more access network edge nodes, each of which being connected with one or more access nodes; and
each of the access nodes comprising at least one of the following: an access node supporting layer-3 routing, an access node supporting layer-2, an access node supporting IP bridging, and an access node supporting address resolution protocol proxy; and at least one access node of the one or more access nodes, connected to a customer premises network (CPN) in a digital subscriber line (DSL) access technique or a passive optical network (PON) access technique, and configured to enable a user terminal in the CPN to access to the access network system, wherein the access node is configured to communicate with another access node in the access network system;

wherein the access node is configured to proxy-forward an address resolution protocol message and store an IP bridging forwarding table;

wherein the access network edge nodes are connected with the access nodes in at least one of the following networking modes: star, tree, chain, and dual-ring, wherein in the case of unicast service, the access network edge nodes are connected with the access nodes in a star or tree networking mode; and in the case of multicast or broadcast service, the access network edge nodes are connected with the access nodes in a chain or dual-ring networking mode;

wherein the IP session information in the IP bridging forwarding table comprises: a user-side physical port, a user IP address, and a user MAC address;

the IP service connection information in the IP bridging forwarding table comprises a MAC address of the access network edge node; and wherein the IP service connection information further comprises at least one of the following information: a network-side physical port and a virtual local area network identifier.

2. The access network system according to claim 1, wherein user data is transmitted directly between the access nodes to support communication between users of different access nodes; and if a failure occurs between one of the access nodes and one of the access network edge nodes, the one of the access node is connected with one of the access network edge node via another access node.

3. An access device in an access network system, wherein the access device is connected to a customer premises network (CPN) in a digital subscriber line (DSL) access technique or a passive optical network (PON) access technique, comprising:

a user-side port module, configured to communicate with a user terminal in the CPN;

a network-side port module, configured to communicate with an access network edge node; wherein the access network edge node is connected with one or more access devices in at least one of the following networking modes: star, tree, chain, and dual-ring, wherein in the case of unicast service, the access network edge nodes are connected with the access devices in a star or tree networking mode; and in the case of multicast or broadcast service, the access network edge nodes are connected with the access devices in a chain or dual-ring networking mode;

an access device-side port module, configured to communicate with another access device in the access network system;

an address resolution protocol proxy module, which is connected to the user-side port module, the network-side port module and the access device-side port module, configured to proxy-forward an address resolution protocol message; and an IP bridging forwarding module, which is connected to the user-side port module, the network-side port module and the access device-side port module, configured to forward a packet and store an IP bridging forwarding table;

wherein the IP session information in the IP bridging forwarding table comprises: a user-side physical port, a user IP address, and a user MAC address;

the IP service connection information in the IP bridging forwarding table comprises a MAC address of the access network edge node; and wherein the IP service connection information further comprises at least one of the following information: a network-side physical port and a virtual local area network identifier.

4. The access device according to claim 3, wherein if the access device receives an address resolution protocol request, the address resolution protocol proxy module in the access device is configured to forward the address resolution protocol request to a next access device, and forward a Media Access Control (MAC) address of the access device in an address resolution protocol response to a sender of the address resolution protocol request.

5. The access device according to claim 3, wherein in the IP bridging forwarding table of the access device, the item of the user MAC address is a MAC address of a previous access device or user terminal connected with the user-side physical port; or in the IP bridging forwarding table of the access device, the item of the MAC address of the access network edge node is a MAC address of a next access device or network edge node connected with the network-side physical port.

6. The access device according to claim 5, wherein if the access device receives a packet, the access device is configured to search in the IP bridging forwarding table according to the IP address in the packet to obtain at least one of the IP session information and/or the IP service connection information, update MAC frame header information in the received packet according to the at least one of the IP session information and/or the IP service connection information, and forward the updated packet to a next access device.

7. An address resolution protocol proxy method in an access network system, applied to address resolution protocol proxy between a first access node and a second access node of multiple access nodes, wherein the access network system comprises one or more access network edge nodes, each of the access network edge node is connected with one or more access nodes in at least one of the following networking modes: star, tree, chain, and dual-ring, wherein the access network system provides both a unicast service and either a multicast service or broadcast service, in the case of unicast service, the access network edge nodes are connected with the access nodes in a star or tree networking mode; and in the case of multicast or broadcast service, the access network edge nodes are connected with the access nodes in a chain or dual-ring networking mode; the method comprising:

forwarding, by the first access node, an address resolution protocol request from an address resolution protocol requestor to the second access node, and sending, by the first access node, a media access control (MAC) address of the first access node in a first address resolution protocol response to the address resolution protocol requestor; and sending, by the second access node, the MAC address of the second access node in a second address resolution protocol response to the first access node.

8. An IP bridging forwarding method in an access network system, applied to IP bridging forwarding between a first access node and a second access node of multiple access nodes, wherein IP bridging forwarding tables are created in the first access node and the second access node respectively, wherein the access network system comprises one or more access network edge nodes, each of the access network edge node is connected with one or more access nodes in at least one of the following networking modes: star, tree, chain, and dual-ring, wherein in the case of unicast service, the access network edge nodes are connected with the access nodes in a star or tree networking mode; and in the case of multicast or broadcast service, the access network edge nodes are connected with the access nodes in a chain or dual-ring networking mode; the method comprising:

searching, by the first access node, an IP bridging forwarding table thereof according to an IP address in a received packet to obtain at least one of IP session information and IP service connection information;

updating, by the first access node, MAC frame header information in the received packet according to at least one of the IP session information and the IP service connection information;

forwarding, by the first access node, the updated packet to the second access node;

wherein the IP session information in the IP bridging forwarding table comprises: a user-side physical port, a user IP address, and a user MAC address;

the IP service connection information in the IP bridging forwarding table comprises a MAC address of the access network edge node; and wherein the IP service connection information further comprises at least one of the following information: a network-side physical port and a virtual local area network identifier.

9. The IP bridging forwarding method according to claim 8, wherein the first access node obtains a MAC address of a user device via a dynamic host configuration protocol message initiated by a user device, to create the IP bridging forwarding table thereof.

10. The IP bridging forwarding method according to claim 8, wherein in the IP bridging forwarding table of the second access node, the item of the user MAC address corresponding to the user-side physical port connected with the first access node is the MAC address of the first access node.

11. The IP bridging forwarding method according to claim 10, wherein in the IP bridging forwarding table of the first access node, the item of the MAC address of the access network edge node corresponding to the network-side physical port connected with the second access node is the MAC address of the second access node directed to the access network edge node.

12. The IP bridging forwarding method according to claim 11, wherein if the packet is sent from a user terminal to the access network edge node, the IP bridging forwarding method comprises:

searching, by the first access node, in the IP bridging forwarding table according to a source IP address of the packet from the user terminal to obtain the network-side physical port, the virtual local area network identifier and the MAC address of the access network edge node;

updating, by the first access node, a destination MAC address of the packet with the MAC address of the second access node, updating a source MAC address of the packet with the MAC address of the first access node, and adding or updating the virtual local area network identifier of the packet; and forwarding, by the first access node, the updated packet to the second access node via the obtained network-side physical port.

13. The IP bridging forwarding method according to claim 11, wherein if the packet is sent from a user terminal to the access network edge node, the IP bridging forwarding method comprises:

searching, by the second access node, in the IP bridging forwarding table according to a source IP address of the packet from the user terminal to obtain the network-side physical port, the virtual local area network identifier and the MAC address of the access network edge node;

updating, by the second access node, a destination MAC address of the packet with the MAC address of the access network edge node, updating a source MAC address of the packet with the MAC address of the second access node, and adding or updating the virtual local area network identifier of the packet; and forwarding, by the second access node, the updated packet to the access network edge node via the obtained network-side physical port.

14. The IP bridging forwarding method according to claim 12, wherein if the packet is sent from the access network edge node to the user terminal, the IP bridging forwarding method comprises:

searching, by the second access node, in the IP bridging forwarding table according to a destination IP address of the packet from the network-side physical port to obtain the user-side physical port and the user MAC address;

updating the destination MAC address of the packet with the MAC address of the first access node, updating the source MAC address of the packet with the MAC address of the second access node; and forwarding, by the second access node, the updated packet to the first access node via the obtained user-side physical port.

15. The IP bridging forwarding method according to claim 12, wherein if the packet is sent from the access network edge node to the user terminal, the IP bridging forwarding method comprises:

searching, by the first access node, in the IP bridging forwarding table according to a destination IP address of the packet from the network-side physical port to obtain the user-side physical port and the user MAC address;

updating the destination MAC address of the packet with the user MAC address, updating the source MAC address of the packet with the MAC address of the first access node; and forwarding, by the first access node, the updated packet to the user terminal via the obtained user-side physical port.

16. The access network system according to claim 3, wherein in the IP bridge forwarding table of the access device, the item of the MAC address of the access network edge node is a MAC address of one of a next device and network edge node connected with the network side physical port.

* * * * *